(12) United States Patent
Choi et al.

(10) Patent No.: US 12,385,664 B2
(45) Date of Patent: Aug. 12, 2025

(54) AIR CONDITIONER

(71) Applicant: LG ELECTRONICS INC., Seoul (KR)

(72) Inventors: Changmin Choi, Seoul (KR); Soonyong Choi, Seoul (KR); Hyuntak Lee, Seoul (KR); Juntae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 359 days.

(21) Appl. No.: 17/958,774

(22) Filed: Oct. 3, 2022

(65) Prior Publication Data
US 2023/0116826 A1 Apr. 13, 2023

(30) Foreign Application Priority Data
Oct. 7, 2021 (KR) .................. 10-2021-0133403

(51) Int. Cl.
*F24F 11/79* (2018.01)
*F24F 11/62* (2018.01)
*F24F 110/10* (2018.01)

(52) U.S. Cl.
CPC .............. *F24F 11/79* (2018.01); *F24F 11/62* (2018.01); *F24F 2110/10* (2018.01)

(58) Field of Classification Search
CPC ......... F24F 11/79; F24F 11/62; F24F 2110/10
See application file for complete search history.

(56) References Cited

U.S. PATENT DOCUMENTS

2012/0022703 A1* 1/2012 Yeo ................... F24F 11/63
700/277
2016/0341438 A1* 11/2016 Yaegashi ............... F24F 1/0014

FOREIGN PATENT DOCUMENTS

| JP | 2004150731 A | * | 5/2004 |
| JP | 6396542 | | 9/2018 |
| KR | 10-2238868 | | 4/2021 |
| WO | WO 2020/003447 | | 1/2020 |

OTHER PUBLICATIONS

Iwata et al., Air Conditioner, May 27, 2004, JP2004150731A, Whole Document (Year: 2004).*
European Search Report dated Feb. 15, 2023 issued in Application No. 22199925.3.

* cited by examiner

*Primary Examiner* — Larry L Furdge
(74) *Attorney, Agent, or Firm* — KED & ASSOCIATES

(57) ABSTRACT

A method of controlling an air conditioner is disclosed. The air conditioner includes an outdoor unit, and a plurality of indoor units respectively connected to the outdoor unit and including at least one vane that adjusts a wind direction, and a fan that forms an air flow. The method includes detecting an indoor temperature of each of the plurality of indoor units through a temperature sensor disposed in each of the plurality of indoor units; specifying an indoor unit having a temperature imbalance as a target indoor unit based on the indoor temperature of each of the plurality of indoor units detected through the temperature sensor; specifying indoor units adjacent to the target indoor unit as support indoor units; and performing a support operation for resolving the temperature imbalance of the target indoor unit by adjusting the at least one vane and the fan of the support indoor unit.

18 Claims, 21 Drawing Sheets

(IDU A, IDU E) are in the same space

AIR CONDITIONER

CROSS-REFERENCE TO RELATED APPLICATION

This application claims the priority benefit of Korean Patent Application No. 10-2021-0133403, filed on Oct. 7, 2021, the disclosure of which is incorporated herein by reference in its entirety.

BACKGROUND OF THE INVENTION

1. Field of the Invention

The present disclosure relates to an air conditioner. In particular, the present disclosure relates to an air conditioner capable of automatically determining the relative positions of several indoor units, and quickly and effectively resolving an imbalance in air temperature in an indoor space.

2. Description of the Related Art

In general, an air conditioner refers to a device that cools and heats a room through a process of compression, condensation, expansion, and evaporation of a refrigerant. When an outdoor heat exchanger of air conditioner serves as a condenser and an indoor heat exchanger of air conditioner serves as an evaporator, a room can be cooled. On the other hand, when the outdoor heat exchanger of air conditioner serves as an evaporator and the indoor heat exchanger of air conditioner serves as a condenser, the room can be heated.

When the air conditioner is equipped with several indoor units installed in different indoor spaces, temperature imbalance between the indoor spaces occupied by several indoor units may occur due to causes excluding user settings (e.g., radiant heat, concentration of occupants, and existence of heating element). In this case, when an occupant moves from an indoor space occupied by a certain indoor unit among several indoor units to an indoor space occupied by other indoor unit, the occupant may feel discomfort due to the above mentioned temperature imbalance.

Accordingly, there is a need for research on a method for resolving the above mentioned temperature imbalance. In addition, as a premise for resolving the above mentioned temperature imbalance, there is a need for research on a method of automatically classifying the positions of several indoor units, based on a correlation between various indoor units with respect to the temperature change of the indoor space corresponding to the cooling or heating operation of the various indoor units.

SUMMARY OF THE INVENTION

An object of the present disclosure is to solve the above and other problems.

Another object may be to provide an air conditioner that searches for a target indoor unit in which a temperature imbalance has occurred and performs a cooperative operation for resolving the temperature imbalance in a space by adjusting a support vane of a support indoor unit adjacent to the target indoor unit, and a method of controlling an air conditioner relating to the above cooperative operation.

Another object may be to provide an air conditioner capable of automatically classifying indoor units disposed in the same indoor space based on a temperature characteristic of indoor air for each indoor space, and a specific method of controlling an air conditioner for the above classification.

Another object may be to provide an air conditioner for determining the relative positions of indoor units disposed in the same indoor space based on a temperature trend of floor temperature corresponding to each installation area of the indoor units, and a method of controlling an air conditioner for determining the relative positions of the indoor units.

Another object may be to provide an air conditioner that determine a vane direction of each indoor unit based on a relative position of the indoor units disposed in the same indoor space and a response value of a reference indoor unit according to an operation for each vane of the indoor unit adjacent to the reference indoor unit, and a control method of an air conditioner that determines the vane direction of each of the above indoor unit.

In accordance with an aspect of the present disclosure, a method of controlling an air conditioner including an outdoor unit; and a plurality of indoor units respectively including a vane connected to the outdoor unit and adjusting a wind direction, and a fan for forming an air flow, includes: detecting an indoor temperature of each of the plurality of indoor units through a temperature sensor disposed in each of the plurality of indoor units; specifying an indoor unit having a temperature imbalance as a target indoor unit based on the indoor temperature of each of the plurality of indoor units detected through the temperature sensor; specifying indoor units adjacent to the target indoor unit as a support indoor unit; and performing a support operation for resolving a temperature imbalance of the target indoor unit by adjusting a vane and a fan of the support indoor unit. The control method of the air conditioner may determine a support indoor unit adjacent to a target indoor unit based on the relative position of the indoor units, and adjust a vane and a fan of the support indoor unit to quickly and effectively solve the temperature imbalance of the target indoor unit.

The vane of the supporter indoor unit which is controlled in performing the support operation is a vane that has the greatest influence on a change in an indoor air temperature of the target indoor unit among vanes of the support indoor unit, and is a support vane for the target indoor unit.

The performing a support operation includes: determining whether an occupant exists in an area of the target indoor unit through a human body sensor disposed in each of the plurality of indoor units; and adjusting a disposition of the support vane according to a presence or absence of occupant in the area of the target indoor unit.

In adjusting a disposition of the support vane, an operation mode of the support vane is performed in a first mode in which the disposition of the support vane is adjusted so that air does not flow toward an occupant, when the occupant exists in an indoor area of the target indoor unit, and is performed in a second mode in which the disposition of the support vane is continuously changed, when there is no occupant in the indoor area of the target indoor unit, thereby effectively solving the temperature imbalance of the target indoor unit as long as it does not cause discomfort to the occupants.

The performing a support operation includes: determining a degree of temperature imbalance of a target indoor unit based on an absolute value of a difference between an average indoor temperature of indoor units disposed in a same indoor space and an indoor temperature of the target indoor unit; and adjusting a fan of the support indoor unit based on the degree of temperature imbalance of the target indoor unit.

The adjusting a fan of the support indoor unit includes: adjusting a rotation speed of the fan of the support indoor unit to a first rotation speed, when an absolute value of a difference between an average indoor unit air temperature of indoor units disposed in a same indoor space and an indoor air temperature of target indoor unit is greater than a first reference temperature and less than a second reference temperature; and adjusting the rotation speed of the fan of the support indoor unit to a second rotation speed higher than the first rotation speed, when an absolute value of a difference between an average indoor unit air temperature of indoor units disposed in a same indoor space and an indoor air temperature of target indoor unit is greater than the second reference temperature, thereby quickly solving the temperature imbalance of the target indoor unit by increasing the rotation speed of the indoor fan of the support indoor unit according to the degree of temperature imbalance of the target indoor unit.

The method further includes: detecting an indoor floor temperature of each of the plurality of indoor units through a second temperature sensor disposed in each of the plurality of indoor units; and determining a relative position between indoor units disposed in a same indoor space by comparing a floor temperature distribution for each area of each of the plurality of indoor units detected by the second temperature sensor, thereby determining the relative position of the indoor units disposed in the same indoor space based on the floor temperature of the indoor units.

The method further includes: determining a vane direction of each of a plurality of indoor units disposed in a same indoor space based on a relative position between the plurality of indoor units, thereby determining the installation direction of the indoor units according to the vane direction of the indoor units.

The determining a vane direction of each of the plurality of indoor units includes: selecting any one indoor unit from among a plurality of indoor units disposed in a same indoor space as a reference indoor unit; sequentially operating the vane of each indoor unit adjacent to the reference indoor unit; detecting a temperature change of indoor air of the reference indoor unit according to a vane operation of each indoor unit adjacent to the reference indoor unit; and determining a vane direction of each indoor unit adjacent to the reference indoor unit based on the temperature change of indoor air of the indoor unit.

The determining a vane direction of each indoor unit adjacent to the reference indoor unit includes determining a vane having the greatest influence on the temperature change of indoor air of the reference indoor unit, among vanes of each indoor unit adjacent to the reference indoor unit, as a support vane for the reference indoor unit, thereby determining the support vane to be adjusted to resolve the temperature imbalance of the target indoor unit, during cooperative operation.

The support vane is disposed in a position facing the reference indoor unit in an indoor unit adjacent to the reference indoor unit.

BRIEF DESCRIPTION OF THE DRAWINGS

The above and other objects, features and advantages of the present disclosure will be more apparent from the following detailed description in conjunction with the accompanying drawings, in which:

FIGS. 1 to 2B are diagrams for explaining a configuration of an air conditioner according to an embodiment of the present disclosure, FIG. 1 shows a connection relationship of a plurality of indoor units to an outdoor unit of the air conditioner, FIG. 2B illustrates a flow of refrigerant in a cooling operation mode of the air conditioner;

FIG. 3 illustrates an outdoor unit controller and an integrated controller of the air conditioner, and FIG. 4 illustrates an indoor unit controller of the air conditioner;

FIGS. 7 to 9 are diagrams for explaining a method of classifying indoor units disposed in the same indoor space according to an embodiment of the present disclosure, FIG. 7 illustrates an air temperature distribution for each time of respective indoor units (IDU A, IDU E, IDU K), FIG. 9 illustrates indoor units classified according to indoor spaces S1 and S2 by clustering;

FIG. 11 illustrates a state in which the floor temperature for each area of respective indoor units (IDU A, IDU D) is detected through a second temperature sensor, and FIG. 12 illustrates the temperature trend of a floor temperature distribution of each indoor unit according to x-axis and y-axis directions;

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
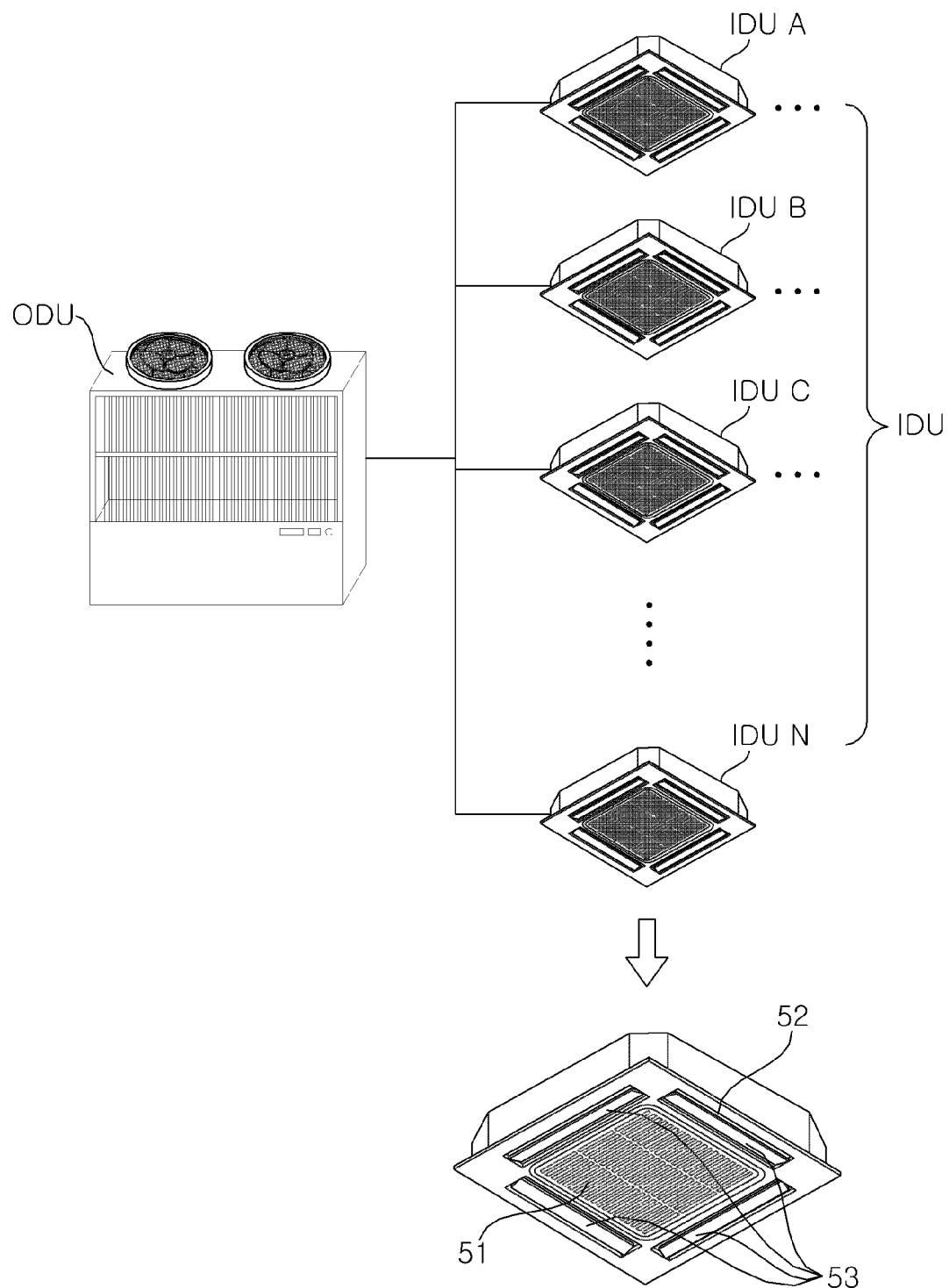

Referring to FIGS. 1 and 2, an air conditioner may include an outdoor unit ODU and an indoor unit IDU that are connected to each other by a refrigerant pipe. The air conditioner may include at least one outdoor unit OUD and a plurality of indoor units IUD. The plurality of indoor units (IDU: IDU A, IUD B, IUD C, . . . , IUD N) may be connected to at least one outdoor unit OUD through a refrigerant pipe. The plurality of indoor units IDU may be installed to be spaced apart from each other in an indoor space, and may be disposed in the same indoor space or in a different indoor space.

The outdoor unit OUD may include a compressor 1, an oil separator 2, a switching valve 3, an outdoor heat exchanger 4, an outdoor expansion valve E2, and an accumulator 6.

The indoor unit IDU may include an indoor heat exchanger 5 and an indoor expansion valve E1.

The compressor 1 may compress a low-temperature, low-pressure refrigerant flown from the accumulator 6 into a high-temperature, high-pressure refrigerant. For example, the compressor 1 may be an inverter type compressor capable of controlling an amount of refrigerant and a refrigerant discharge pressure by adjusting an operation frequency (Hz). In addition, the compressor 1 may be an oil compressor in which oil is used as a lubricant.

The oil separator 2 may recover oil from the refrigerant discharged from the compressor 1 and provide it to the compressor 1 again. At this time, a first check valve C1 may be installed in a pipe through which the oil separated in the oil separator 2 flows to the compressor 1. The first check valve C1 may limit the flow direction of the oil so that the oil separated by the oil separator 2 is directed to the compressor 1.

The switching valve 3 may selectively guide the refrigerant flown from the oil separator 2 to the outdoor heat exchanger 4 or the indoor heat exchanger 5. For example, the switching valve 3 may be a four-way valve.

The outdoor heat exchanger 4 may exchange heat between the refrigerant and outdoor air. The heat transfer direction between the refrigerant and the outdoor air in the outdoor heat exchanger 4 may be different depending on the operation mode of the air conditioner, that is, whether it is a heating operation or a cooling operation. An outdoor fan (not shown) may be installed in one side of the outdoor heat exchanger 4, and forms an air flow to adjust the amount of air provided to the outdoor heat exchanger 4.

The indoor heat exchanger 5 may exchange heat between the refrigerant and the indoor air. The heat transfer direction between the refrigerant and the indoor air in the indoor heat exchanger 5 may be different depending on the operation mode of the air conditioner, that is, whether it is a heating operation or a cooling operation. An indoor fan 55 may be installed on one side of the indoor heat exchanger 5 to form an air flow to control the amount of air provided to the indoor heat exchanger 5.

For example, the indoor heat exchanger 5 may include a plurality of indoor heat exchangers 5a, 5b, and 5c. In this case, the indoor unit IDU may include a first indoor unit (IDU A) having a first indoor heat exchanger 5a, a first indoor fan, and a first indoor expansion valve E1a, a second indoor unit (IDU B) having a second indoor heat exchanger 5b, a second indoor fan, and a second indoor expansion valve E1b, and a third indoor unit IDU C having a third indoor heat exchanger 5c, a third indoor fan, and a third indoor expansion valve E1c. Meanwhile, some of a plurality of indoor heat exchangers 5a, 5b and 5c may be operated and others may not be operated, in response to a load demanded for cooling or heating of the room.

The expansion valve E, E2 may be installed between the outdoor heat exchanger 4 and the indoor heat exchanger 5 to expand the refrigerant that has passed through the outdoor heat exchanger 4 or the indoor heat exchanger 5. In addition, the expansion valve E, E2 may include an outdoor expansion valve E2 adjacent to the outdoor heat exchanger 4 and an indoor expansion valve E1 adjacent to the indoor heat exchanger 5. In this case, the outdoor expansion valve E2 may be used to expand the refrigerant that has passed through the indoor heat exchanger 5, and the indoor expansion valve E1 may be used to expand the refrigerant that has passed through the outdoor heat exchanger 4. For example, the expansion valve E, E2 may be an Electronic Expansion Valve (EEV) capable of adjusting the opening degree of a passage of a refrigerant pipe in which the expansion valve E, E2 is installed.

For example, the indoor expansion valve E1 may include a first indoor expansion valve E1a for expanding the refrigerant provided to the first indoor heat exchanger 5a, a second indoor expansion valve E1b for expanding the refrigerant provided to the second indoor heat exchanger 5b, and a third indoor expansion valve E1c for expanding the refrigerant provided to the third indoor heat exchanger 5c.

For example, the indoor unit IDU may be provided as a ceiling type, a wall mounted type, or a stand type.

For example, the indoor unit IUD may include a casing 50 that forms an outer shape. The lower portion of the casing 50 may include a suction hole 51 for providing indoor air to the indoor heat exchanger 5, and a discharge hole 52 for discharging the air that has passed through the indoor heat exchanger 5 into the room. In addition, the indoor unit IDU may include a vane 53 which is movably installed in the discharge hole 52, and controls the direction of air discharged from the discharge hole 52.

For example, the indoor unit IDU may be a 4-way type indoor unit IDU having one suction hole 51 and four discharge holes 52. In this case, a plurality of vanes 53 may be provided to correspond to the number of discharge holes 52. Specifically, the vane 53 may be vertically spaced along the circumference of the indoor unit IDU.

Referring to FIG. 2, the controller may control the operation of each component of the air conditioner to perform a heating operation or a cooling operation.

<Heating Mode of Air Conditioner>

Figure 2A:
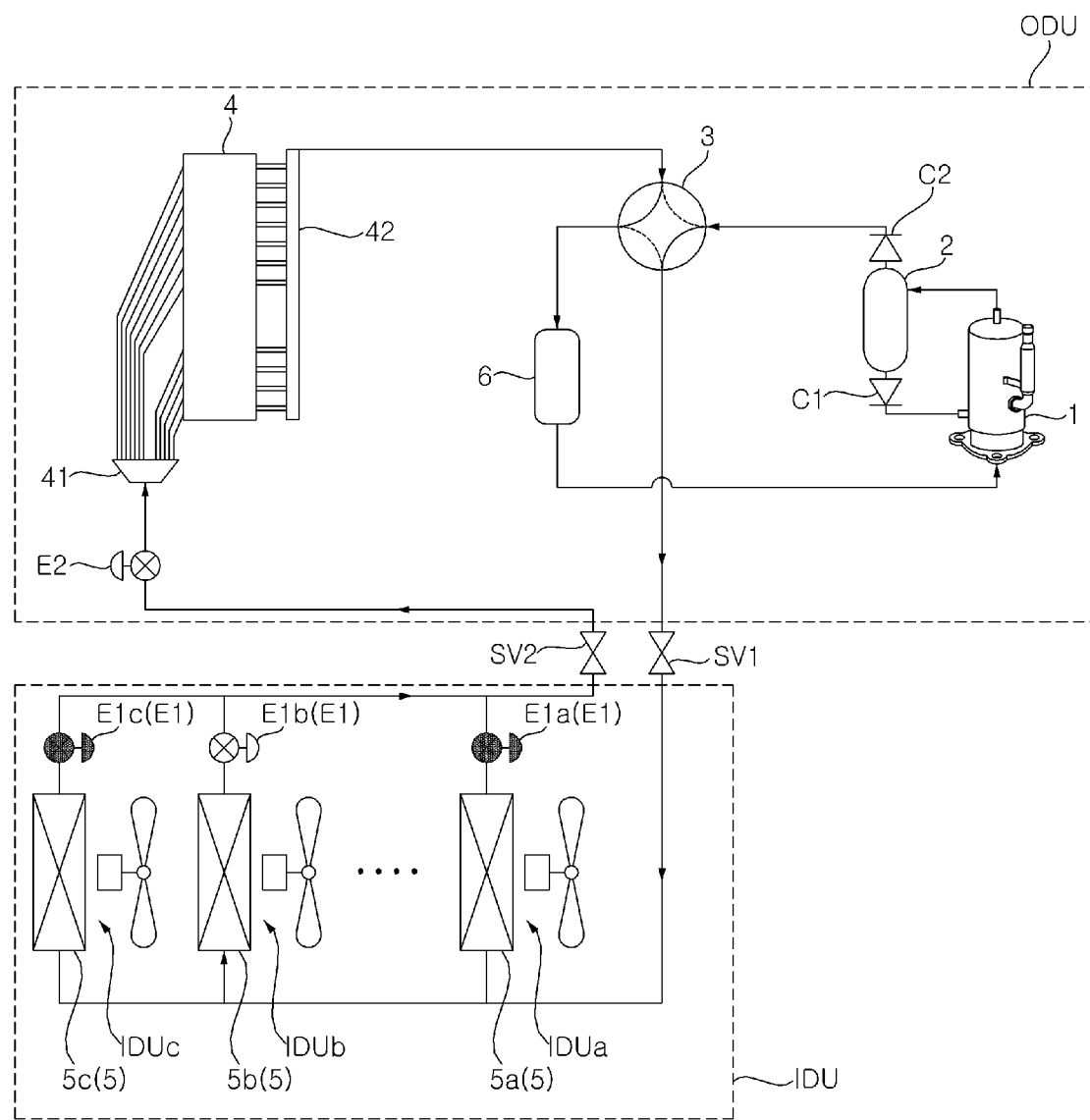
FIG. 2A illustrates a flow of refrigerant in a heating operation mode of the air conditioner.

Referring to FIG. 2A, when a heating operation signal is input to the air conditioner, the indoor unit controller 260 may perform a heating operation of the air conditioner. For example, the heating operation signal may be a signal arbitrarily input by a user.

Specifically, the low-temperature and low-pressure refrigerant flowing into the compressor 1 from the accumulator 6 may be compressed with a high-temperature and high-pressure in the compressor 1 and discharged to the oil separator 2. In addition, the refrigerant from which oil is separated in the oil separator 2 may flow into the second indoor heat exchanger 5b via the switching valve 3 and a first service valve SV1. At this time, the second indoor expansion valve E1$b$ may completely open the passage of the refrigerant that passes through the second indoor heat exchanger 5b and leads to the outdoor heat exchanger 4. In addition, the first indoor expansion valve E1$a$ and the third indoor expansion valve E1$c$ may close the passage of the refrigerant that passes through the first indoor heat exchanger 5a and the third indoor heat exchanger 5c and leads to the outdoor heat exchanger 4. In addition, when a required heating load increases, the first indoor expansion valve E1$a$ and/or the third indoor expansion valve E1$c$ may also be opened.

As thermal energy is transferred from the refrigerant to the indoor air in the second indoor heat exchanger 5b, the refrigerant may be condensed. In this case, the second indoor heat exchanger 5b may serve as a condenser. In addition, according to the heat exchange between the refrigerant and the indoor air, the indoor space may be heated. The refrigerant condensed while passing through the second indoor heat exchanger 5b may pass through the outdoor expansion valve E2, via the second indoor expansion valve E1$b$ and a second service valve SV2. The refrigerant expanded through the outdoor expansion valve E2 may be distributed to a plurality of points of the outdoor heat exchanger 4 through the distributor 41.

As thermal energy of outdoor air is transferred from the outdoor heat exchanger 4 to the refrigerant, the refrigerant may be evaporated. At this time, the outdoor heat exchanger 4 may serve as an evaporator. The refrigerant evaporated while passing through the outdoor heat exchanger 4 may flow into the compressor 1, via the header 42, the switching valve 3, and the accumulator 6 sequentially. Accordingly, the refrigerant cycle for the heating operation of the above-described air conditioner may be completed.

<Cooling Operation Mode of Air Conditioner>

Figure 2B:
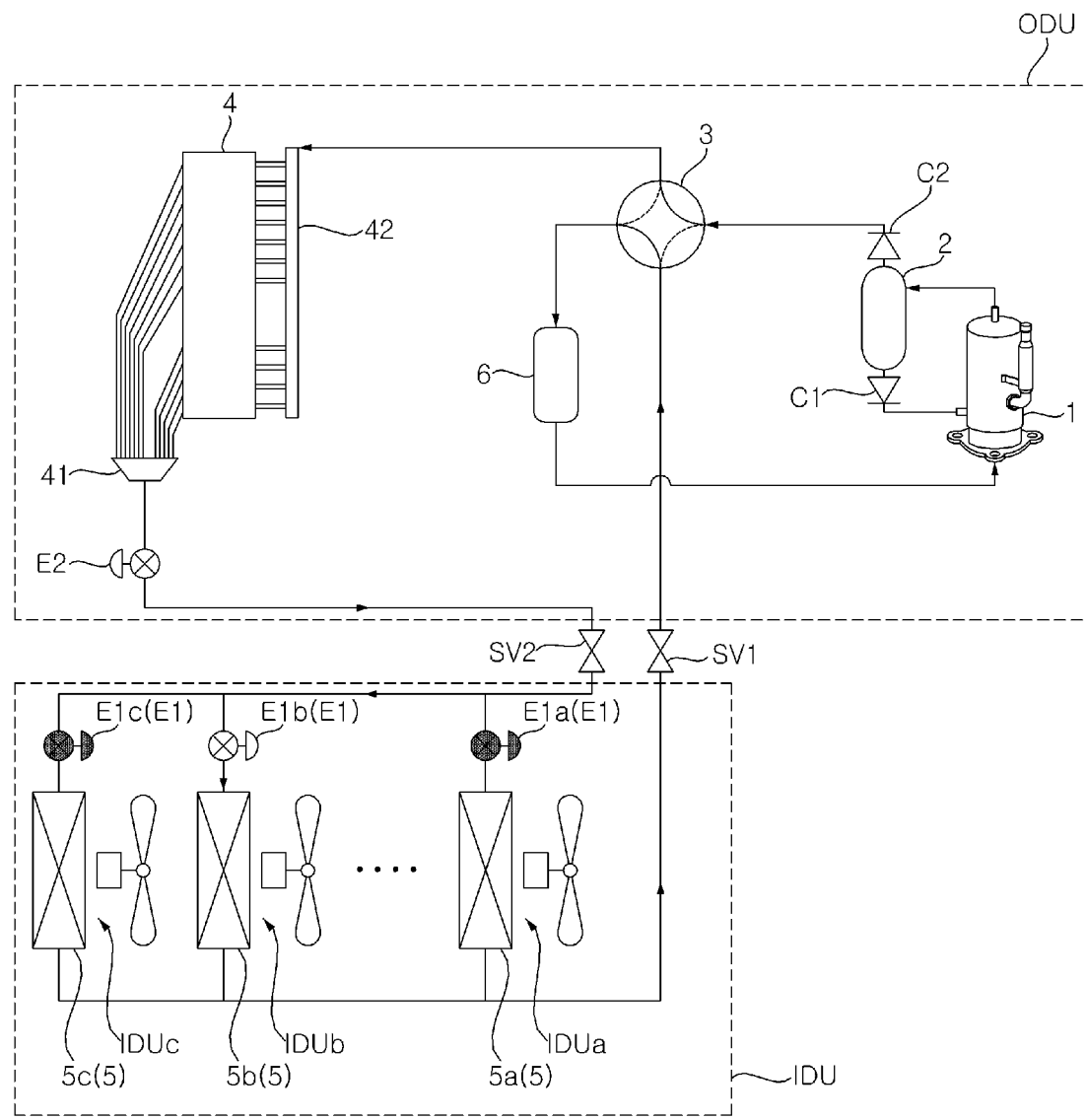

Referring to FIG. 2B, when a cooling operation signal is input to the air conditioner, the indoor unit controller 260 may perform a cooling operation of the air conditioner. For example, the cooling operation signal may be a signal arbitrarily input by a user.

Specifically, the low-temperature and low-pressure refrigerant flowing into the compressor 1 from the accumulator 6 may be compressed with a high-temperature and a high-pressure in the compressor 1 and discharged to the oil separator 2. In addition, the refrigerant from which oil is separated in the oil separator 2 may flow into the outdoor heat exchanger 4 through the switching valve 3 and the header 42.

As heat energy is transferred from the refrigerant to the outdoor air in the outdoor heat exchanger 4, the refrigerant may be condensed. At this time, the outdoor heat exchanger 4 may serve as a condenser.

The refrigerant condensed while passing through the outdoor heat exchanger 4 may flow into the second indoor expansion valve E1$b$ via the distributor 41, the outdoor expansion valve E2, and the second service valve SV2 sequentially. At this time, the outdoor expansion valve E2 may completely open the passage. In addition, the refrigerant expanded while passing through the second indoor expansion valve E1$b$ may flow into the second indoor heat exchanger 5b. In addition, when the required cooling load increases, the first indoor expansion valve E1$a$ and/or the third indoor expansion valve E1$c$ may also be opened with a certain opening degree.

As thermal energy of indoor air is transferred from the second indoor heat exchanger 5b to the refrigerant, the refrigerant may be evaporated. In this case, the second indoor heat exchanger 5b may serve as an evaporator. In addition, according to the heat exchange between the refrigerant and the indoor air, the indoor space may be cooled. The refrigerant evaporated while passing through the second indoor heat exchanger 5b may flow into the compressor 1 via the first service valve SV1, the switching valve 3, and the accumulator 6 sequentially. Accordingly, the refrigerant cycle for the cooling operation of the above-described air conditioner may be completed.

At least one outdoor unit ODU and a plurality of indoor units (IDU A, IDU B, . . . , IDU N) are electrically connected to each other, and electrically connected to each component of the air conditioner, thereby controlling the operation of each component of the air conditioner.

Hereinafter, a controller for controlling the operation of each component of the air conditioner will be described with reference to FIGS. 3 and 4. For example, the controller may include an outdoor unit controller 160, an indoor unit controller 260, and an integrated controller 360.

Figure 3:
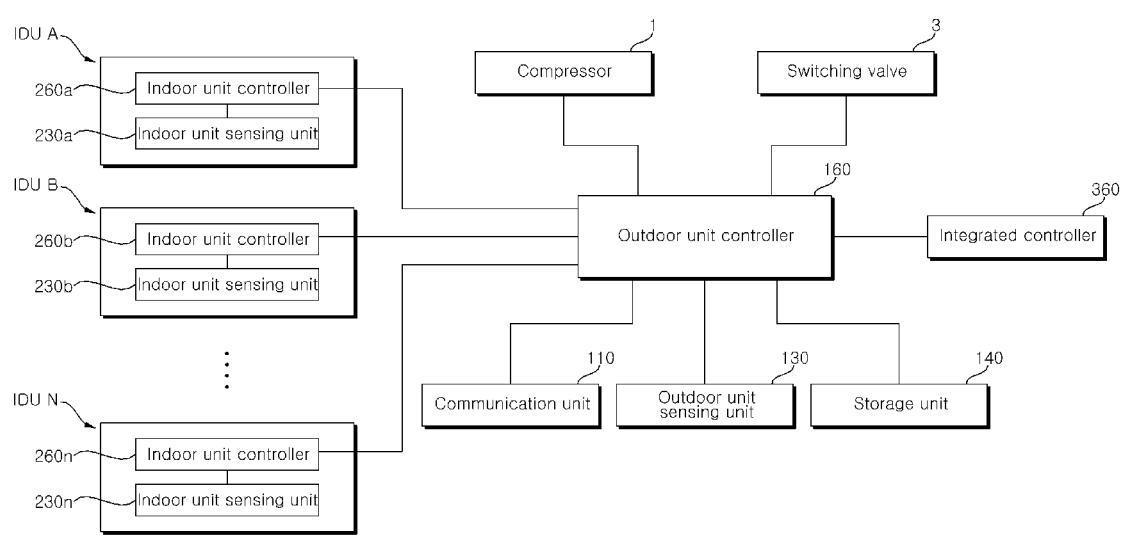
FIGS. 3 and 4 are control block diagrams of an air conditioner according to an embodiment of the present disclosure.

Referring to FIG. 3, the outdoor unit ODU may include a communication unit 110, an outdoor unit sensing unit 130, a storage unit 140, and an outdoor unit controller 160.

The communication unit 110 may include at least one communication module. The communication unit 110 may transmit/receive data between the outdoor unit ODU and the indoor unit IDU. For example, the communication method between the outdoor unit (ODU) and the indoor unit (IDU) may be a communication method using power line, a serial communication method (e.g., RS-485 communication), and wired communication method through a refrigerant pipe, as well as a wireless communication method such as Wi-Fi, Bluetooth, Beacon, and Zigbee.

In addition, the communication unit 110 may transmit/receive data between external devices. For example, the communication unit 110 may establish a wireless communication channel with an external device (e.g., a mobile terminal), and may transmit and receive data on the state of each component provided in the air conditioner, the occurrence of error, and the like through the established wireless communication channel. The communication unit 110 may access a server connected to an external network to transmit/receive data.

The outdoor unit sensing unit 130 may include a plurality of sensors. The outdoor unit sensing unit 110 may transmit data on a detection value detected through a plurality of sensors to the outdoor unit controller 160. For example, the outdoor unit sensing unit 110 may include an outdoor heat exchanger temperature sensor (not shown) which is disposed adjacent to the outdoor heat exchanger 4 to detect a condensation temperature or an evaporation temperature of the refrigerant, a compressor pressure sensor (not shown) which is disposed at a suction end and/or discharge end of the compressor 1 to detect the suction pressure and/or discharge pressure of the compressor 1, and an outdoor temperature sensor (not shown) that detects outdoor temperature.

The storage unit 140 may store a program for processing and controlling each signal in the outdoor unit controller 100. For example, the storage unit 140 may store application programs designed for the purpose of performing various tasks that can be processed by the outdoor unit controller 100, and may selectively provide some of the stored application programs upon a request from the outdoor unit controller 100.

In addition, the storage unit 140 may store data related to each component provided in the outdoor unit ODU. For example, the storage unit 140 may store data on a detection value detected from a plurality of sensors provided in the outdoor unit sensing unit 130. For example, the storage unit 140 may store data on power consumption, operation frequency, and the like of the compressor 1. For example, the storage unit 140 may store data on the number of rotations of an outdoor fan (not shown), the opening degree, superheating degree, subcooling degree of the expansion valve E, E2, and the like.

The outdoor unit controller 160 may be connected to each component provided in the outdoor unit ODU, and may control the overall operation of each component. The outdoor unit controller 160 may transmit/receive data to and from each component provided in the air conditioner.

The outdoor unit controller 160 may include at least one processor. Here, the processor may be a general processor such as a central processing unit (CPU). In addition, the processor may be a dedicated device such as an ASIC or other hardware-based processor.

The outdoor unit controller 160 may obtain data related to each component provided in the outdoor unit ODU. In this case, the outdoor unit controller 160 may obtain data related to each configuration provided in the outdoor unit ODU at a given time interval according to a certain period in consideration of a computational load.

The outdoor unit controller 160 may check the operation mode of the air conditioner, and may control the operation of each component provided in the air conditioner according to the operation mode of the air conditioner. For example, the outdoor unit controller 160 may adjust the switching valve 3 so that the refrigerant discharged from the compressor 1 flows into the indoor heat exchanger 5 in the heating operation mode of the air conditioner, or may adjust the switching valve 3 so that the refrigerant discharged from the compressor 1 flows into the outdoor heat exchanger 4 in the cooling operation mode of the air conditioner.

Figure 4:
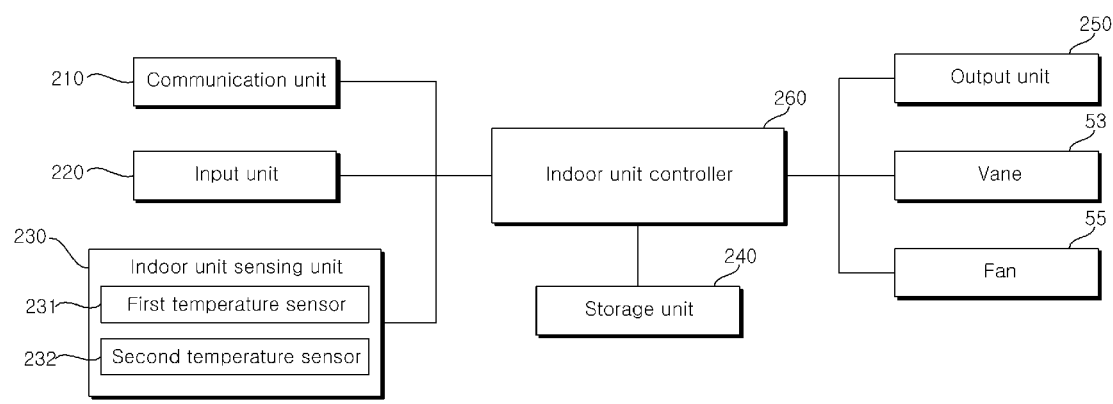

Referring to FIG. 4, the indoor unit IDU may include a communication unit 210, an input unit 220, an indoor unit sensing unit 230, a storage unit 240, an output unit 250, and an indoor unit controller 260.

The communication unit 210 may include at least one communication module. The communication unit 210 may transmit/receive data between the outdoor unit ODU and the indoor unit IDU. For example, the communication method between the outdoor unit ODU and the indoor unit IDU may be a communication method using power line, a serial communication method (e.g., RS-485 communication), and wired communication method through a refrigerant pipe, as well as a wireless communication method such as Wi-Fi, Bluetooth, Beacon, and Zigbee.

The input unit 220 may include at least one input module. The input unit 220 may receive information or a command from a user, generate an input signal, and transmit the generated input signal to the indoor unit controller 260. For example, the input unit 220 may receive information or a command related to the operation mode of the air conditioner. For example, the input unit 220 may correspond to a remote control.

The indoor unit sensing unit 230 may include a plurality of sensors. The indoor unit sensing unit 230 may transmit data on a detection value detected through a plurality of sensors to the indoor unit controller 260. For example, the indoor unit sensing unit 230 may include a first temperature sensor 231 detecting an air temperature Ta of each indoor unit and a second temperature sensor 232 detecting a floor temperature Tb of each indoor unit. For example, the second temperature sensor 232 may be a thermopile sensor that detects a temperature distribution in a floor area corresponding to an indoor space in which the indoor unit IDU is disposed. The first temperature sensor 231 and the second temperature sensor 232 may be integrally formed as an integrated temperature sensor.

In addition, the indoor unit sensing unit 230 may include a human body sensor (not shown) for detecting occupants existing in the indoor space. For example, the human body sensor may be a photographing device such as a camera for detecting occupants in an indoor space.

The storage unit 240 may store programs for processing and controlling each signal in the indoor unit controller 260. For example, the storage unit 240 may store application programs designed for the purpose of performing various tasks that can be processed by the indoor unit controller 260, and may selectively provide some of the stored application programs upon request of the indoor unit controller 260. For example, the storage unit 240 may store programs related to the operation mode of the air conditioner.

In addition, the storage unit 240 may store data related to each configuration provided in the indoor unit IDU. For example, the storage unit 240 may store data on a detection value detected from a plurality of sensors provided in the indoor unit sensing unit 230. For example, the storage unit 240 may store data on the indoor unit air temperature Ta, the indoor unit floor temperature Tb, and the like. For example, the storage unit 140 may store data on the operation state of the vane 53, the operation state of the indoor fan 55, and the like.

The output unit 250 may transmit information related to the operating state of the air conditioner to a user. For example, the output unit 250 may transmit the current operation mode of the air conditioner, the operation mode set temperature, the current indoor temperature, the air volume intensity, and the like to a user. For example, the output unit 250 may include a display device such as a display and/or an audio device such as a speaker.

The indoor unit controller 260 may be connected to each component provided in the indoor unit IDU, and may control the overall operation of each component. The indoor unit controller 2760 may transmit/receive data to and from each component provided in the indoor unit IDU.

The indoor unit controller 260 may check the operation mode of the air conditioner, and may control the operation of each component provided in the indoor unit (IDU A) according to the operation mode of the air conditioner. For example, the indoor unit controller 260 may control the amount of air discharged into the indoor space by adjusting the rotation speed of the indoor fan 55. For example, the indoor unit controller 260 may control the airflow angle discharged into the indoor space by adjusting the angle of the vane 53.

Referring back to FIG. 3, the integrated controller 360 may be electrically connected to the outdoor unit controller 160 and the indoor unit controller 260 to obtain information related to each configuration of the outdoor unit ODU and the indoor unit IDU. The integrated controller 360 may be formed independently of the outdoor unit controller 160, but is not limited thereto and may be formed integrally with the outdoor unit controller 160. In addition, the integrated controller 360 may generate a control signal for each configuration of the air conditioner based on the obtained information, and may transmit the control signal to the outdoor unit controller 160 and the indoor unit controller 260.

For example, the integrated controller 360 may generate a learning model for determining the position of each of the plurality of indoor units IDU and the direction of the vanes 53 provided in the indoor unit IDU, by learning data related to each configuration provided in the air conditioner through machine learning, and may determine the position of each of the plurality of indoor units IDU and the direction of the vanes 53 provided in the indoor unit (IDU B)y using the generated learning model.

For example, the integrated controller 360 may determine an indoor space in which each of the indoor units IDU is disposed through a similarity analysis of the distribution of the air temperature Ta of each of the indoor units IDU.

For example, the integrated controller 360 may determine the position between the indoor units IDUs disposed in the same space through a temperature trend analysis of the distribution of the floor temperature Tb of each of the indoor units IDU.

For example, the integrated controller 360 may determine the vane direction of each of the indoor units IDU by comparing the change in the air temperature of a target indoor unit according to the operation for each vane of a support indoor unit described later.

Here, machine learning is a field of artificial intelligence AI, and refers to a research field that gives computers the ability to learn without an explicit program. Specifically, machine learning refers to a technology for solving problems by self-learning and predicting based on empirical data, rather than executing preset program instructions.

Accordingly, when a temperature imbalance occurs in any one indoor unit among a plurality of indoor units IDU disposed in an indoor space, the air conditioner may determine an indoor unit (target indoor unit) in which the temperature imbalance has occurred, indoor units (support indoor unit) adjacent to the target indoor unit, and the vane direction of the support indoor unit, through machine learning, and adjusts the vane 53 to perform a cooperative operation (support operation) for resolving temperature imbalance.

Hereinafter, a method of controlling an air conditioner for resolving a temperature imbalance generated in an indoor space by using machine learning will be described.

Figure 5:
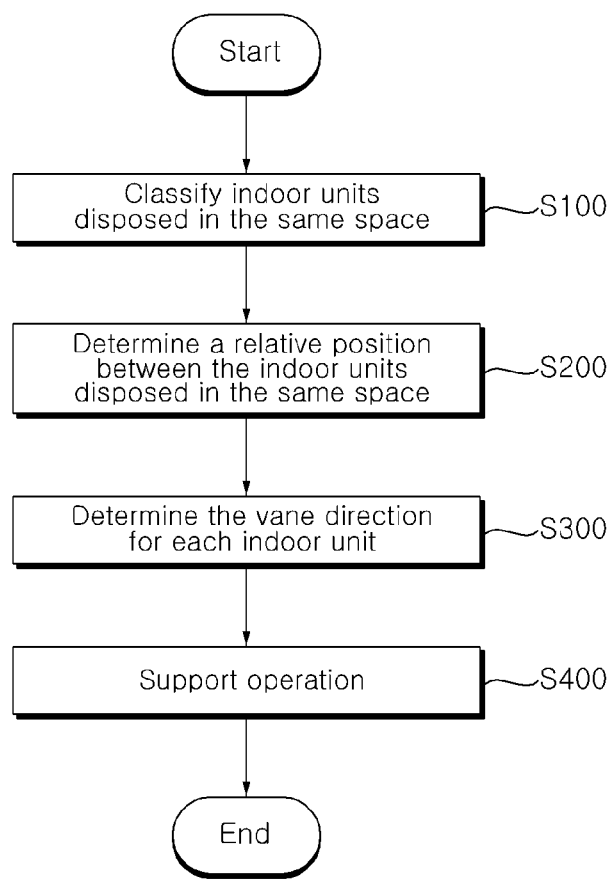
FIG. 5 is a flowchart illustrating a method of controlling an air conditioner according to an embodiment of the present disclosure.

Referring to FIG. 5, the air conditioner may classify indoor units IDU disposed in the same indoor space (S100). For example, the air conditioner may classify the indoor units IDU for each indoor space by comparing the distribution of the air temperature Ta of each of the plurality of indoor units IDU.

Figure 6:
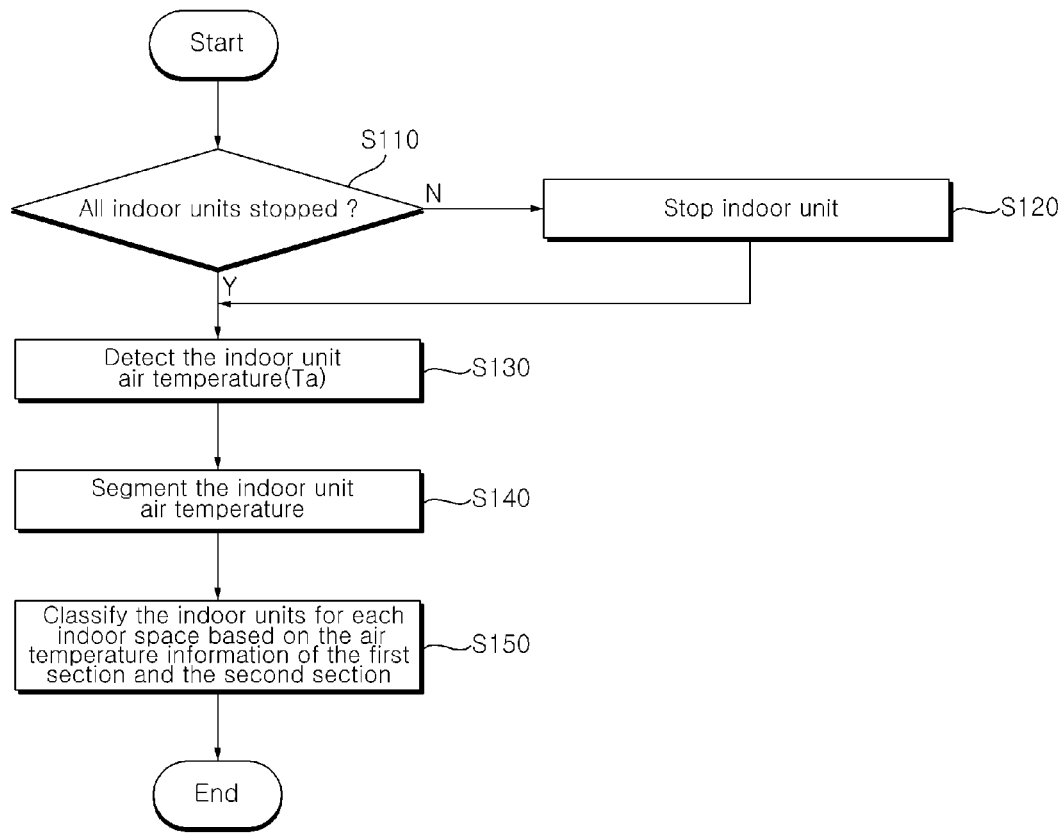
FIG. 6 is a flowchart illustrating a method of classifying indoor units disposed in the same indoor space according to an embodiment of the present disclosure.

Referring to FIG. 6, the air conditioner may determine whether all of a plurality of indoor units IDU are in a stationary state (S110).

For example, if a plurality of indoor units IDU are divided and disposed in a plurality of indoor spaces (S1, S2, . . . ) rather than in a single indoor space (see FIG. 9), when all the indoor units IDU are in a stationary state, the air temperature characteristic of a space 1 (S1) and a space 2 (S2) has a different air temperature characteristic according to a load for each space. Therefore, in order to classify the indoor units IDU disposed in the same indoor space by using such an air temperature characteristic for each space, it is necessary to determine whether all of the plurality of indoor units IDUs are currently in a stationary state.

When any one of the plurality of indoor units IDU is in operation (NO at S110), the air conditioner may stop the operation of the indoor unit that is in operation (S120). After S129, the air conditioner may perform S130 described later.

When all of the plurality of indoor units IDU are in a stationary state (YES at S110), the air conditioner may detect the air temperature Ta of each of the indoor units IDU (S130). For example, the air conditioner may obtain and store the indoor air temperature Ta for each time of each of the plurality of indoor units IDU through a first temperature sensor 211. For example, the air conditioner may store information on the indoor air temperature Ta of each of the indoor units IDU detected for a certain period (e.g. 70 hours) in the storage unit.

After S130, the air conditioner may segment the indoor unit air temperature Ta obtained at S130 (S140). For example, the air conditioner may divide the air temperature Ta of each indoor unit IDU into a first section and a second section in order to remove a time-dependent variable component in the same indoor unit IDU.

After S140, the air conditioner may classify the indoor units IDU for each indoor space based on the air temperature Ta information of the first section and the second section (S150). For example, the air conditioner may classify through a clustering model such that indoor units IDU having a similar air temperature Ta distribution are disposed in the same space.

For example, the clustering model may be a K-Means clustering method. The K-means clustering is an algorithm that groups given information into k clusters, operates in a manner that minimizes the variance of the distance between clusters, and classifies information having similar characteristics into the same cluster.

Figure 7:
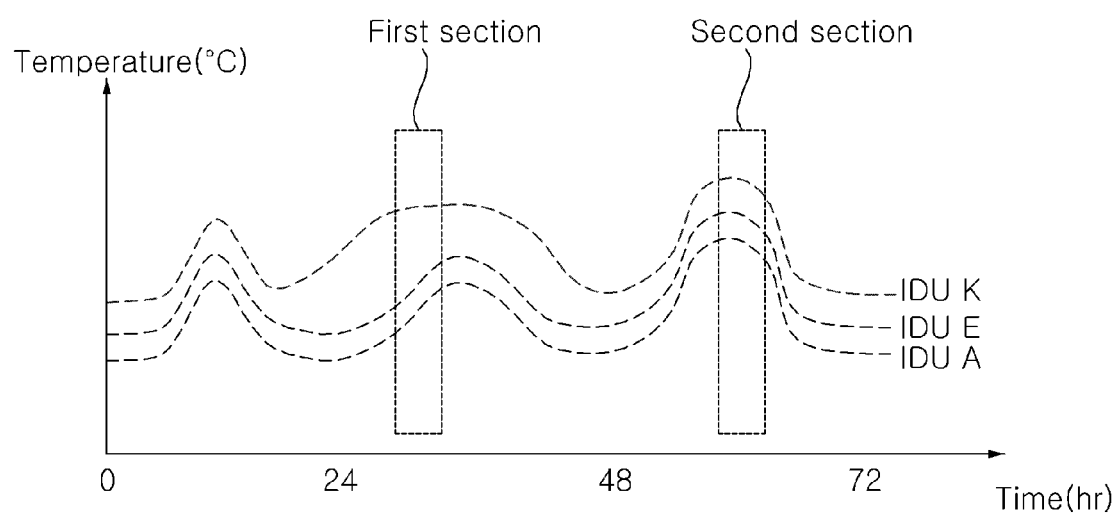

Referring to FIG. 7, the air conditioner selects an arbitrary indoor unit (IDU A, IDU E, IDU K) from among a plurality of indoor units IDU, and may obtain an air temperature Ta distribution for each time for each of the arbitrary indoor unit (IDU A, IDU E, IDU K). For example, the air conditioner may divide the air temperature Ta distribution for each time of each of the arbitrary indoor unit (IDU A, IDU E, IDU K) into a first section that is a morning time zone and a second section that is an afternoon time zone.

Figure 8A:
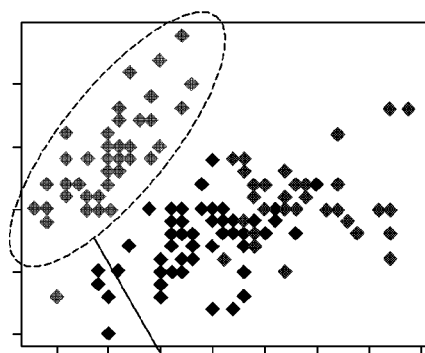
FIGS. 8A and 8B illustrate the results of clustering a first section and a second section of an air temperature for each time of respective indoor units.
Figure 8B:
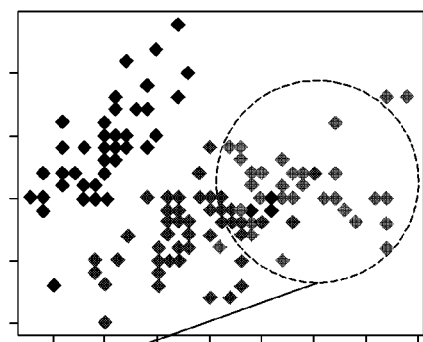

Referring to FIG. 8, looking at the result of clustering the air temperature Ta according to the first section (FIG. 8A) and the result of clustering the air temperature Ta according to the second section (FIG. 8B), it can be seen that one indoor unit (IDU A) arbitrary selected from among a plurality of indoor units (IDU) and another indoor unit (IDU E) belong to the same cluster, and the remaining indoor unit (IDU K) belongs to other cluster. That is, it can be seen that in the air conditioner, one indoor unit (IDU A) and another indoor unit (IDU E) are disposed in space 1 (S1) which is the same indoor space, and the remaining indoor unit (IDU K) is disposed in the space 2 (S2) which is other indoor space.

Figure 9:
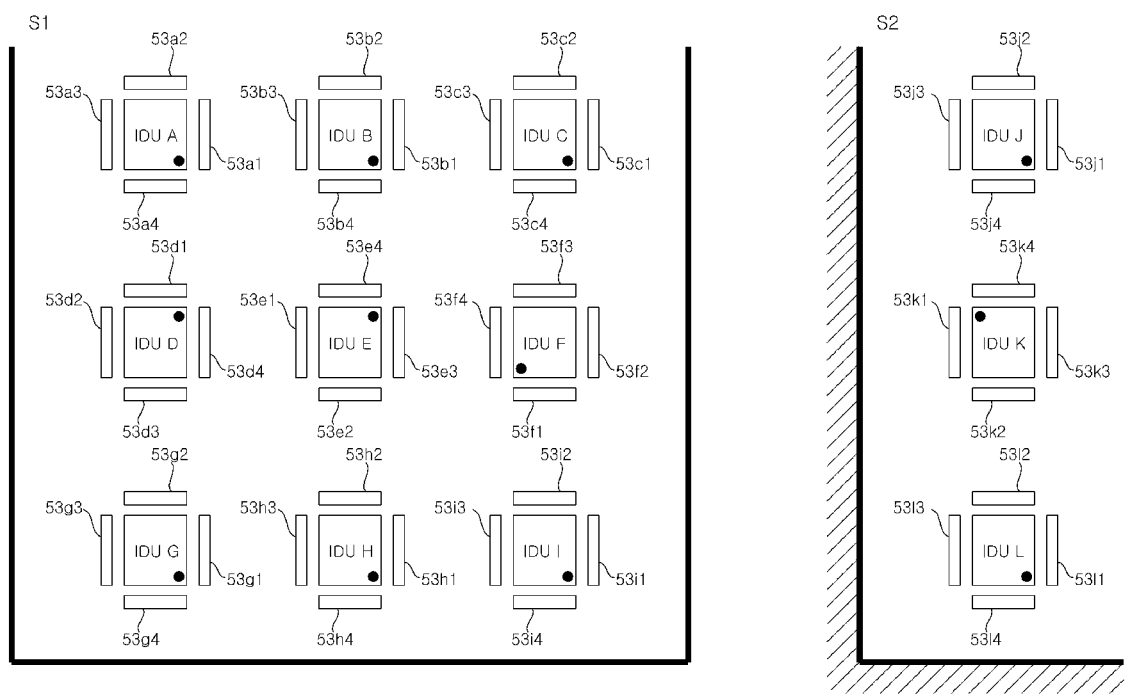

Referring to FIG. 9, the air conditioner may classify the indoor units (IDUA, IDU B, IDU C, . . . , IDU I) disposed in space 1 (S1), and the indoor units (IDU J, IDU K, IDU L, . . . ) disposed in the space 2 (S2) through a clustering model using the distribution of the air temperature Ta of each of the plurality of indoor units IDU.

That is, the air conditioner may automatically classify the indoor units IDU disposed in the same indoor space based on the distribution of the air temperature Ta for each time of the indoor units.

Again, referring to FIG. 5, the air conditioner may determine a relative position between the indoor units IDU disposed in the same indoor space (S200). For example, the air conditioner may determine a relative position between the indoor units IDU by comparing the distribution of the floor temperature Tb of each of the indoor units IDU disposed in the same indoor space.

Figure 10:
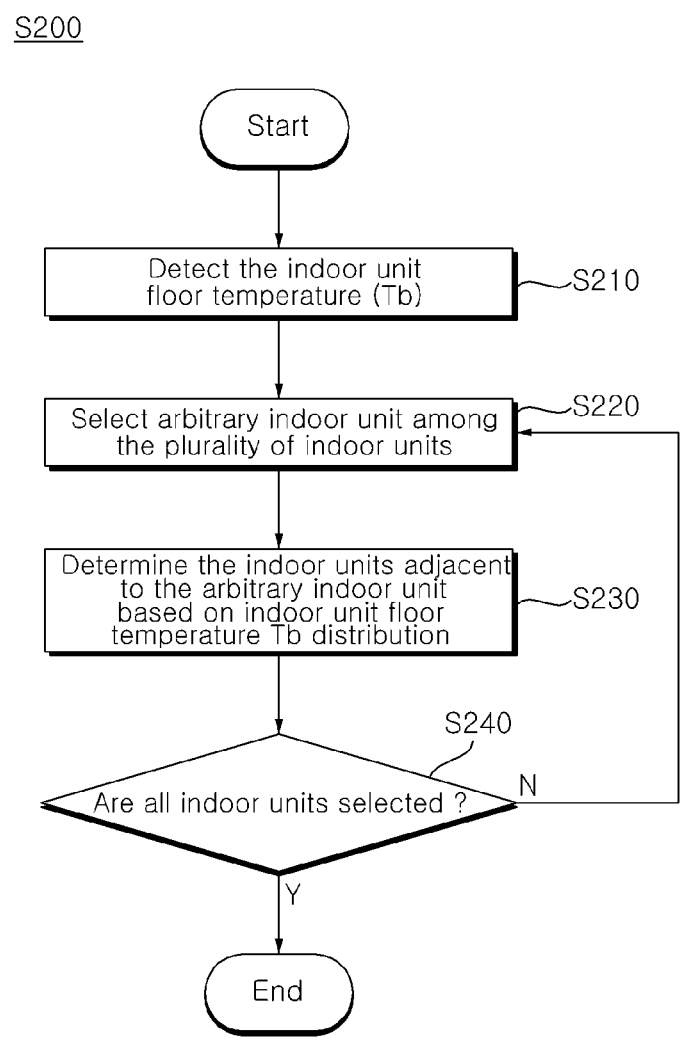
FIG. 10 is a flowchart illustrating a method of determining a relative position between indoor units disposed in the same indoor space according to an embodiment of the present disclosure.

Referring to FIG. 10, the air conditioner may detect the indoor unit floor temperature Tb of each of the indoor units IDU (S210). For example, the air conditioner may detect and store the floor temperature Tb for each area of each of the plurality of indoor units IDU through the second temperature sensor 212.

After S210, the air conditioner may arbitrarily select one of the plurality of indoor units IDU (S220). In this case, the arbitrarily selected indoor unit IDU may be an indoor unit that serves as a reference for the air conditioner to perform S200, and may be referred to as a "reference indoor unit".

After S220, the air conditioner may determine the indoor units IDUs adjacent to the reference indoor unit based on indoor unit floor temperature Tb information (S230). Here, the indoor unit adjacent to the reference indoor unit may mean a case in which another indoor unit is not disposed with a vertical distance between the reference indoor unit and the adjacent indoor unit.

For example, the air conditioner may analyze a temperature trend in the X-axis direction of the distribution of the floor temperature Tb of the indoor unit of the reference indoor unit, and determine the indoor unit following the temperature trend in the X-axis direction of the reference indoor unit as an indoor unit adjacent to the reference indoor unit in the X-axis direction among the remaining indoor units IDU excluding the reference indoor unit, based on the temperature trend in the X-axis direction of the reference indoor unit.

In addition, the air conditioner may grasp a temperature trend in the Y-axis direction of the distribution of the floor temperature Tb of the indoor unit of the reference indoor unit, and determine the indoor unit following the temperature trend in the Y-axis direction of the reference indoor unit as an indoor unit adjacent to the reference indoor unit in the Y-axis direction among the indoor units IDU excluding the reference indoor unit, based on the temperature trend in the Y-axis direction of the reference indoor unit. Accordingly, the air conditioner may determine the position of the indoor units adjacent to the reference indoor unit in the X-axis and Y-axis directions.

Here, when the indoor unit IDU is a ceiling type indoor unit, the X axis and the Y axis may be a directional axis set based on the floor surface of the indoor space when the indoor unit IDU is viewed from above.

After S230, the air conditioner may determine whether all of the plurality of indoor units IDUs are selected as the reference indoor unit (S240). When all indoor units are not selected as the reference indoor unit (No in S240), the air conditioner may return to S220 and perform S230 and S240 again.

Figure 11:
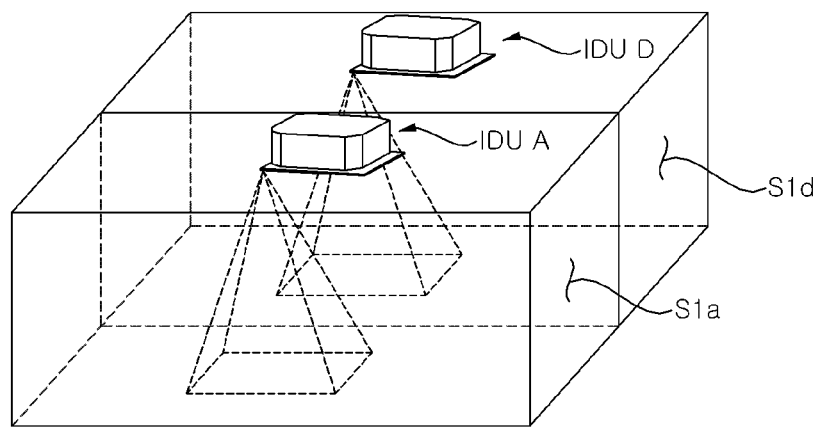
FIGS. 11 and 12 are diagrams for explaining a method of determining a relative position between indoor units disposed in the same indoor space according to an embodiment of the present disclosure.

Referring to FIG. 11, it can be seen that the indoor unit A (IUD A) and the indoor unit D (IDU D) are disposed in space 1 (S1) which is the same indoor space, and occupy a portion of the space 1 (S1), respectively. For example, the indoor unit A (IUD A) may occupy a partial area S1a of the space 1 (S1), and the indoor unit D (IUD D) may occupy the partial area S1d of the space 1 (S1). Accordingly, the indoor unit A (IUD A) and the indoor unit D (IUD D) may detect the floor temperature Tb corresponding to a respectively occupied area through the second temperature sensor 212.

Figure 12:
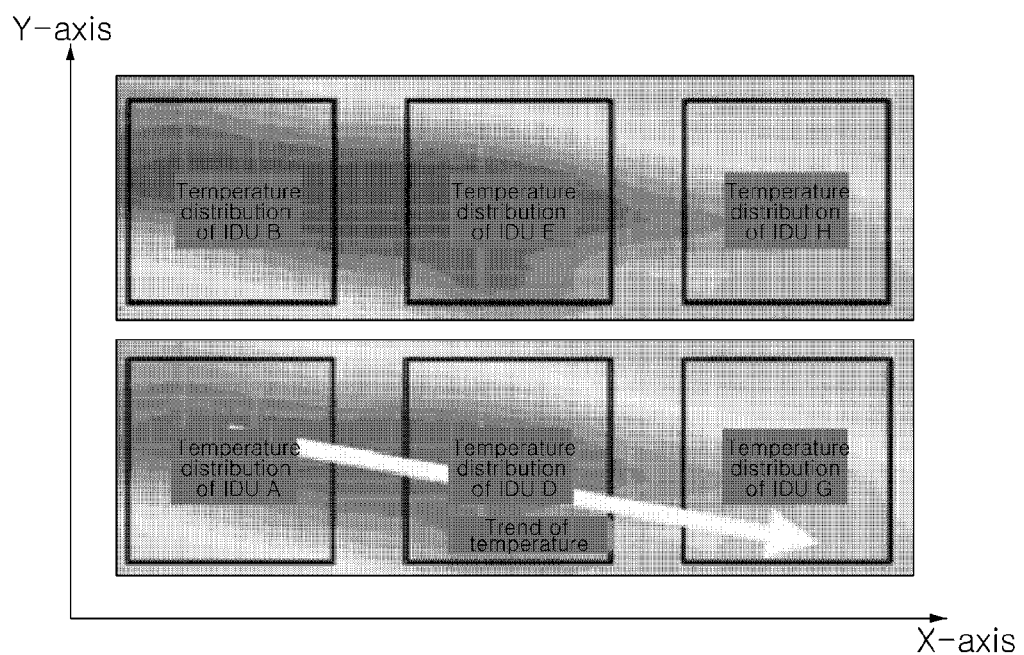

Referring to FIG. 12, when indoor unit A (IDU A) among a plurality of indoor units IDU disposed in space 1 (S1), which is the same indoor space, is specified as a reference indoor unit, the air conditioner may detect the floor temperature Tb distribution of each of the plurality of indoor units IDU, and may analyze the trend of the floor temperature Tb of the reference indoor unit (IDU A) based on the detected floor temperature Tb distribution. Specifically, the air conditioner may check that the indoor unit D (IUD D) is adjacent to the reference indoor unit (IUD A) in the X-axis direction of the reference indoor unit (IDU A), by comparing the distribution of the floor temperature Tb of the reference indoor unit (IUD A) in the X-axis direction with the distribution of the floor temperature Tb of a plurality of indoor units (IDU), based on the trend of the floor temperature Tb in the X-axis direction of the reference indoor unit (IDU A). In addition, the air conditioner may check that the indoor unit B (IUD B) is adjacent to the reference indoor unit (IUD A) in the Y-axis direction of the reference indoor unit (IDU A), by comparing the distribution of the floor temperature Tb of the reference indoor unit (IUD A) in the Y-axis direction with the distribution of the floor temperature Tb of a plurality of indoor units (IDU), based on the trend of the floor temperature Tb in the Y-axis direction of the reference indoor unit (IDU A).

Referring back to FIG. 5, the air conditioner may determine the vane direction of each of the plurality of indoor units IDU (S300). For example, when a plurality of vanes 53 are provided in each of the indoor units IDU, the air conditioner may specify any one indoor unit among a plurality of indoor units IDU as the reference indoor unit, and determine the vane direction of the indoor units adjacent to the reference indoor unit by adjusting each vane 53 of the indoor units adjacent to the reference indoor unit.

Figure 13:
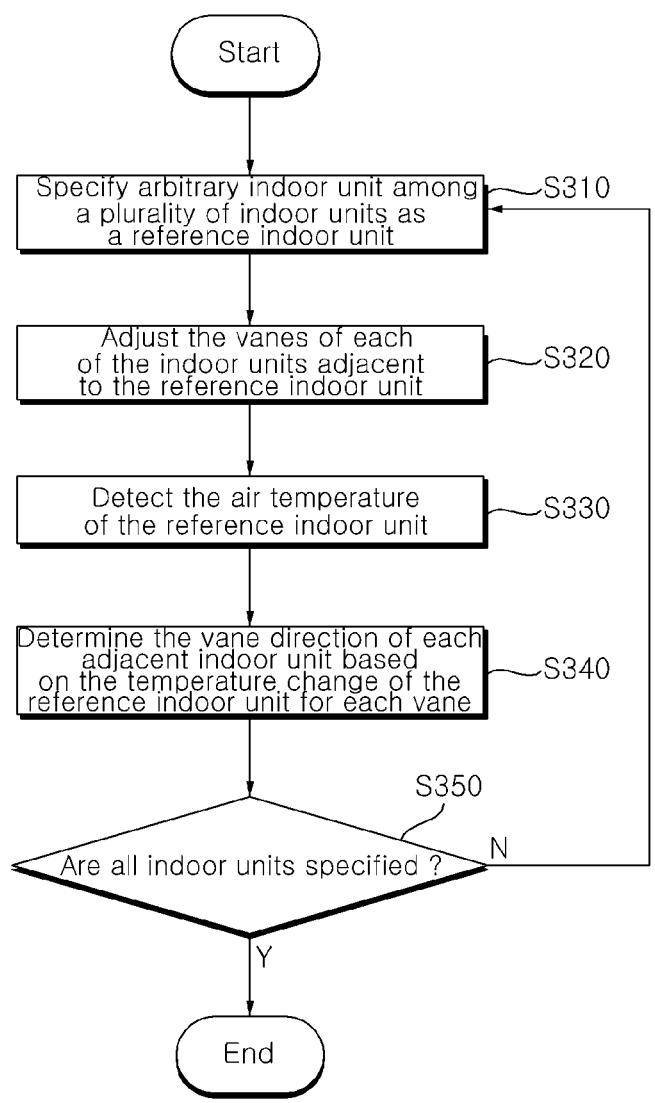
FIG. 13 is a flowchart illustrating a method of determining a vane direction for each of a plurality of indoor units according to an embodiment of the present disclosure.

Referring to FIG. 13, the air conditioner may specify any one indoor unit among a plurality of indoor units IDU as a reference indoor unit (S310). In this case, the arbitrarily selected indoor unit IDU is an indoor unit that serves as a reference for the air conditioner to perform operation S300, and may be referred to as a "reference indoor unit".

After S310, the air conditioner may adjust the vane 53 of each of the indoor units IDU adjacent to the reference indoor unit (S320). For example, in the case of a 4WAY type indoor unit IDU having four vanes 53, the air conditioner may control the wind direction by adjusting each vane 53, or may open/close the discharge hole 52.

After S320, the air conditioner may detect the air temperature Ta of the reference indoor unit (S330).

After S330, the air conditioner may determine the direction of the vane 53 of each adjacent indoor unit based on a response value of the reference indoor unit according to the adjusting of the vane 53 of the indoor units adjacent to the reference indoor unit (S340). For example, the air conditioner may determine that the vane having the greatest effect on the response value of the reference indoor unit among the vanes of the respective indoor units adjacent to the reference indoor unit is located in a direction toward the reference indoor unit. The vane is a vane that is adjusted in a cooperative operation (support operation) described later and may be referred to as a "support vane". In this case, the support vane may be disposed in a position facing the reference indoor unit.

Specifically, the air conditioner may determine the direction of the vane 53 of the adjacent indoor units IDU based on the change value of the air temperature Ta of the reference indoor unit according to the adjusting of the vane 53 of the adjacent indoor units IDU.

After S340, the air conditioner may determine whether all of the plurality of indoor units IDUs are selected as the reference indoor unit (S350). When all the indoor units are not selected as the reference indoor unit (NO at S350), the air conditioner may return to S310 and perform S320, S330, S340, and S350 again.

Figure 14:
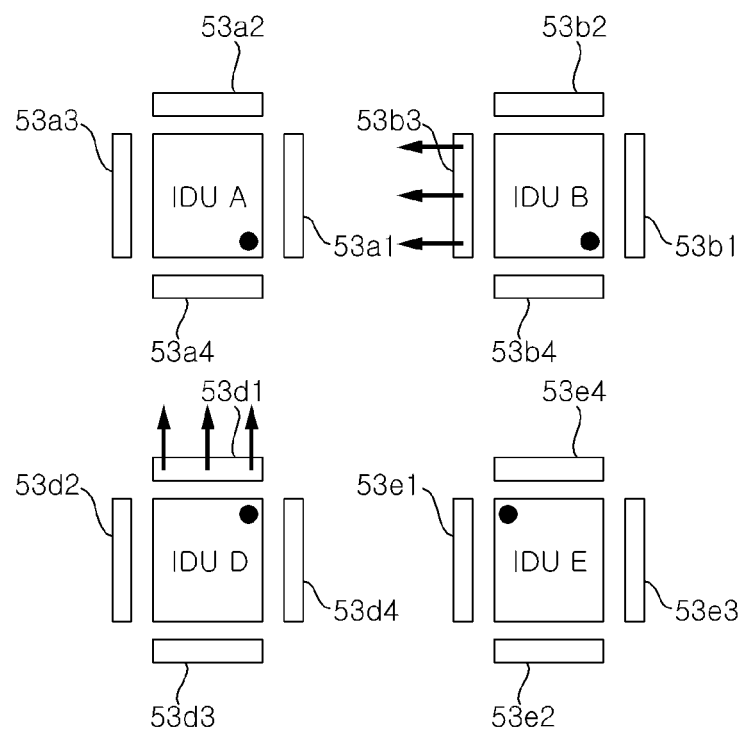
FIG. 14 is a diagram for explaining a method of determining a vane direction for each of a plurality of indoor units according to an embodiment of the present disclosure.

Referring to FIG. 14, when the air conditioner specifies the indoor unit A (IDU A) as the reference indoor unit, the air conditioner may control the vanes 53 of the indoor unit B (IDU B) and the indoor unit D (IDU D) that are adjacent to the reference indoor unit (IDU A). For example, it may be determined that the vane 53$b$3 having the greatest influence on the change in the air temperature Ta of the reference indoor unit (IDU A) is located in a direction toward the reference indoor unit (IDU A), by sequentially adjusting the vanes 53$b$1, 53$b$2, 53$b$3, 53$b$4 of the indoor unit B (IDU B), and detecting and comparing the change in air temperature Ta of the reference indoor unit (IDU A) for each vane 53$b$1, 53$b$2, 53$b$3, 53$b$4. In addition, it may be determined that the vane 53$d$1 having the greatest influence on the change in the air temperature Ta of the reference indoor unit (IDU A) is located in a direction toward the reference indoor unit (IDU D), by sequentially adjusting the vanes 53$d$1, 53$d$2, 53$d$3, 53$d$4 of the indoor unit D (IDU D), and detecting and comparing the change in air temperature Ta of the reference indoor unit (IDU A) for each vane 53$d$1, 53$d$2, 53$d$3, 53$d$4. When the vane direction of the indoor units (IDU B, IDU D) adjacent to the reference indoor unit (IDU D) is determined, the air conditioner may determine the position of the vane 53 of each indoor unit by repeating the above process for each indoor unit by changing the reference indoor unit.

Referring back to FIG. 5, when a temperature imbalance occurs in at least one indoor unit among a plurality of indoor units IDU, the air conditioner may perform a support operation for resolving the temperature imbalance by adjusting indoor units adjacent to the indoor unit in which the temperature imbalance occurs (S400).

Figure 15:
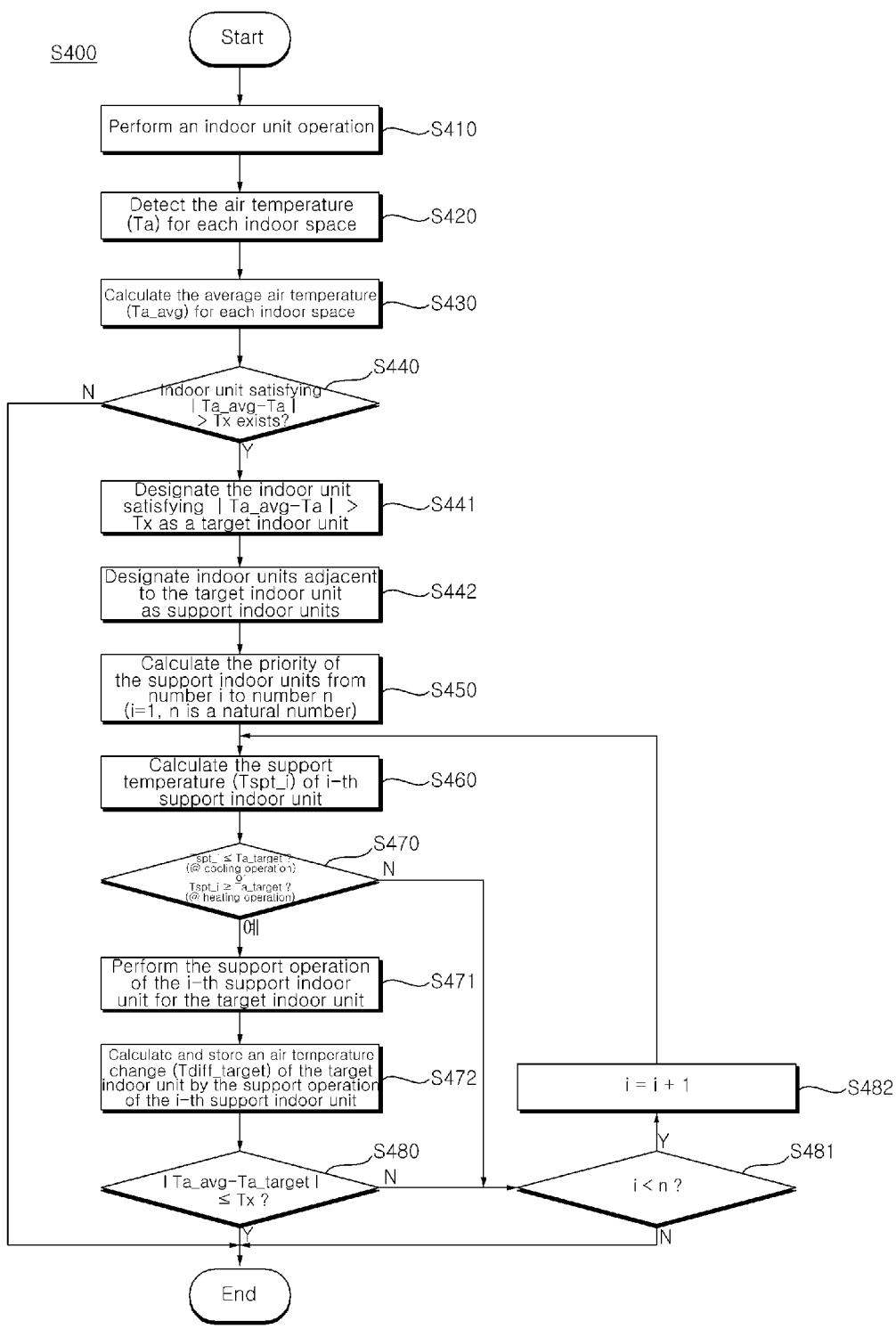
FIG. 15 is a flowchart illustrating a support operation mode of air conditioner according to an embodiment of the present disclosure.

Referring to FIG. 15, the air conditioner may perform an air conditioning operation (i.e., a heating operation or a cooling operation) for each indoor space (S410).

After S410, the air conditioner may detect the indoor air temperature Ta of each of the plurality of indoor units IDU (S420). For example, the air conditioner may detect the air temperature Ta of each indoor unit divided for each indoor space through the first temperature sensor 211.

After S420, the air conditioner may calculate the average air temperature Ta_avg for each indoor space based on the indoor air temperature Ta of each indoor unit (S430). For example, the average air temperature Ta_avg may be an average temperature of the indoor air temperature Ta of each of the indoor units belonging to any one indoor space.

After S430, the air conditioner may determine whether an indoor unit that has an absolute value of difference, between an average air temperature Ta_avg of the indoor space and the indoor air temperature Ta, which is greater than a first reference temperature Tx1 exists among a plurality of indoor units IDU (S440). For example, the first reference temperature Tx1 may be 2° C.

When S440 is satisfied (Yes at S440), the air conditioner may designate an indoor unit that detects an indoor air temperature Ta which has a difference exceeding the first reference temperature Tx1 with respect to the average air temperature Ta_avg of the indoor space, among a plurality of indoor units IDU, as a target indoor unit (S441). In this case, the target indoor unit is an indoor unit in which a temperature imbalance occurs due to a cause excluding a user setting (e.g., radiant heat, concentration of personnel, presence of a heating element, etc.), and it is necessary to solve the temperature imbalance through cooperative operation (support operation) of indoor units adjacent to the target indoor unit.

After S441, the air conditioner may designate indoor units adjacent to the target indoor unit as support indoor units (S442). In this case, the air conditioner may determine the indoor units adjacent to the target indoor unit as the support indoor unit by using relative position information between the indoor units determined at S200.

After S442, the air conditioner may calculate the priority of support operation of the support indoor units from number i to number n based on support priority information (S450, where i=1 and n is a natural number).

For example, as support priority information, the priority score of the support indoor unit may be added with a certain score (e.g. one point), in the case of an indoor unit that is adjacent to at least one target indoor unit when a plurality of target indoor units exist in the same indoor space, and does not perform support operation. In addition, as for the priority score of the support indoor unit, a certain score (e.g. one point) may be added for the target indoor unit, when an absolute value of a difference between a set temperature of the support indoor unit and the indoor air temperature of the support indoor unit is less than a certain temperature (e.g., 2° C.). In addition, as for the priority score of the support indoor unit, a certain score (e.g., one point) may be added to the target indoor unit, when the cooling or heating rated capability of the indoor unit is 0.5 or less. In addition, as for the priority score of the support indoor unit, when the indoor air temperature of the support indoor unit is formed as the set temperature of the support indoor unit and the support indoor unit does not operate, a certain score (e.g., one point) may be added to the target indoor unit.

Accordingly, the support operation priority of the support indoor units may be calculated in proportion to the priority score of the support indoor unit. That is, the support indoor unit having a higher accumulated priority score of the support indoor unit may have a higher priority of support operation.

After S450, the air conditioner may calculate the support temperature Tspt_i of i-th support indoor unit (S460). Here, the support temperature Tspt_i may be a set temperature of the support indoor unit during the support operation.

After S460, the air conditioner may compare the support temperature Tspt_i of i-th support indoor unit with the indoor air temperature Ta_target of the target indoor unit to determine whether the support operation of the i-th support indoor unit is performed (S470). For example, when the indoor space in which the i-th support indoor unit is disposed is in a cooling operation, the air conditioner may determine whether the support temperature Tspt_i of the i-th support indoor unit is equal to or lower than the indoor air temperature Ta_target of the target indoor unit. For example, when the indoor space in which the i-th support indoor unit is disposed is in a heating operation, the air conditioner may determine whether the support temperature Tspt_i of the i-th support indoor unit is equal to or higher than the indoor air temperature Ta_target of the target indoor unit.

At S470, if the support temperature Tspt_i of the i-th support indoor unit is determined to be a suitable temperature for performing the support operation (Yes at S470), the air conditioner may perform the support operation of the i-th support indoor unit for a certain period of time (e.g., 5 minutes)(S471). In addition, the air conditioner may adjust the angle of the airflow discharged toward the target indoor unit by adjusting each vane 53 of the support indoor units during the support operation. For example, the vane adjusted during the support operation is a vane determined based on vane direction information of each indoor unit determined at S300 and may be positioned in a direction toward the target indoor unit. The vane may be referred to as a support vane for the target indoor unit. In addition, the air conditioner may adjust the amount of air discharged toward the target indoor unit by adjusting the rotation speed of the indoor fan 55 of the support indoor unit during the support operation.

After S471, the air conditioner may store an indoor air temperature change Tdiff_target of the target indoor unit by the support operation of the i-th support indoor unit (S472). Here, the indoor air temperature change Tdiff_target of the target indoor unit may be an absolute value of change between the indoor air temperature of the target indoor unit before S471 is performed and the indoor air temperature change of the target indoor unit after S471 is performed for a certain time.

Meanwhile, the priority score of the support indoor unit may be updated based on the indoor air temperature change (Tdiff_target) information of the target indoor unit stored at S472. For example, the priority score of the support indoor unit may be updated in proportion to the indoor air temperature change (Tdiff_target) of the target indoor unit.

After S472, the air conditioner may determine whether the cooperative operation (support operation) of the support indoor unit with respect to the target indoor unit is terminated (S480). For example, the air conditioner may determine whether the absolute value of the difference between the average air temperature Ta_avg of the indoor space and the indoor air temperature Ta_target of the target indoor unit is equal to or lower than the first reference temperature Tx1.

When the absolute value of the difference between the average air temperature Ta_avg of the indoor space and the indoor air temperature Ta_target of the target indoor unit is less than or equal to the first reference temperature Tx1 (Yes at S480), the air conditioner supports the target indoor unit may terminate the cooperative operation (support operation) of the support indoor unit.

When the absolute value of the difference between the average air temperature Ta_avg of the indoor space and the indoor air temperature Ta_target of the target indoor unit exceeds the first reference temperature Tx1 (No at S480), the air conditioner may determine whether the numbering of the support indoor unit is less than n (S481, i<n).

When the numbering of the support indoor unit is less than n (YES at S481), the air conditioner may increase the numbering of the support indoor unit by 1 (S482, i=i+1), and return to S460.

Accordingly, the air conditioner can quickly and effectively solve the temperature imbalance of the target indoor unit through cooperative operation (support operation) of the support indoor unit adjacent to the target indoor unit.

Figure 16:
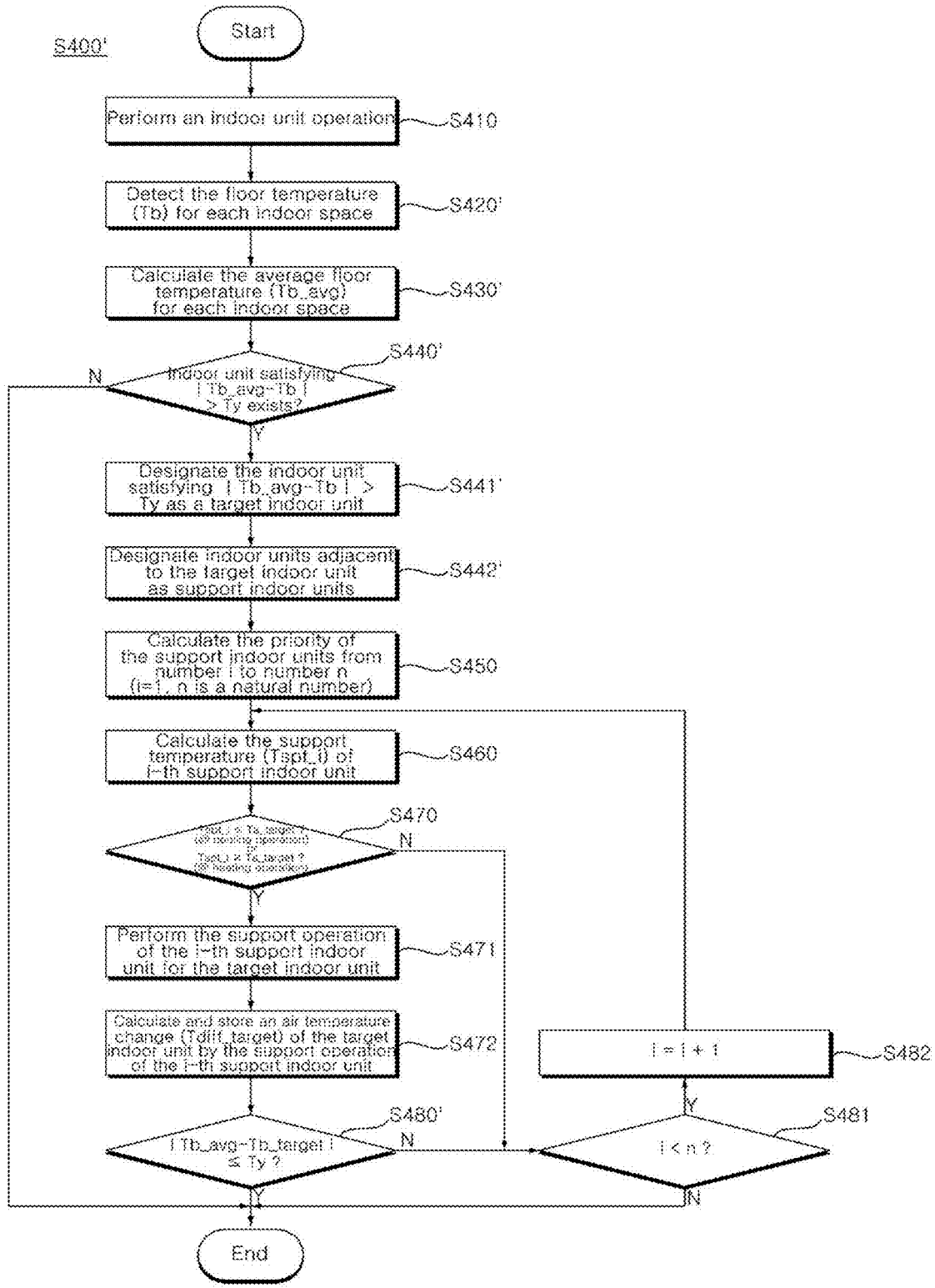
FIG. 16 is a flowchart of a support operation mode of air conditioner according to another embodiment of the present disclosure.

Referring to FIGS. 15 and 16, it is possible to check whether there exists a target indoor unit having a temperature imbalance based on the indoor air temperature Ta, or to designate or cancel the target indoor unit (see FIG. 15). On the other hand, it is possible to check whether there exists a target indoor unit having a temperature imbalance based on the indoor floor temperature Tb, or to designate or cancel the target indoor unit, which will be described in more detail later.

Referring to FIG. 16, the air conditioner may perform an air conditioning operation (i.e., a heating operation or a cooling operation) for each indoor space (S410).

After S410, the air conditioner may detect the indoor floor temperature Tb of each of the plurality of indoor units IDU (S420'). For example, the air conditioner may detect the floor temperature Tb of each of the indoor units divided for each indoor space through a second temperature sensor 212.

After S420', the air conditioner may calculate the average floor temperature Tb_avg for each indoor space based on the indoor floor temperature Tb of each indoor unit (S430'). For example, the average floor temperature Tb_avg may be an average temperature of the indoor floor temperature Tb of each of the indoor units belonging to any one indoor space.

After S430', the air conditioner may determine whether an indoor unit in which the absolute value of the difference between the average floor temperature Tb_avg of the indoor space and the indoor floor temperature Tb is greater than a third reference temperature Ty1 exists among the plurality of indoor units IDU (S440'). At this time, in consideration of the fact that a specific heat of the floor is higher than that of air in the indoor space, the third reference temperature Ty1 may be smaller than the first reference temperature Tx1. For example, the third reference temperature Ty1 may be 1° C.

When S440' is satisfied (Yes at S440'), the air conditioner may designate an indoor unit that detects an indoor floor temperature Tb which has a difference exceeding the third reference temperature Ty1 with respect to the average floor temperature Tb_avg of the indoor space, among a plurality of indoor units IDU, as a target indoor unit (S441'). In this case, the target indoor unit is an indoor unit in which a temperature imbalance occurs due to a cause excluding a user setting (e.g., radiant heat, concentration of personnel, presence of a heating element, and it is necessary to solve the temperature imbalance through cooperative operation (support operation) of indoor units adjacent to the target indoor unit.

After S441', the air conditioner may designate indoor units adjacent to the target indoor unit as support indoor units (S442'). In this case, the air conditioner may determine the indoor units adjacent to the target indoor unit as the support indoor unit by using the relative position information between the indoor units determined at S200.

After S442', the air conditioner may perform S450, S460, S470, S471, and S472 described above.

After S472, the air conditioner may determine whether the cooperative operation (support operation) of the support indoor unit with respect to the target indoor unit is terminated (S480'). For example, the air conditioner may determine whether the absolute value of the difference between the average floor temperature Tb_avg of the indoor space and the indoor floor temperature Tb_target of the target indoor unit is equal to or less than the third reference temperature Ty1.

When the absolute value of the difference between the average floor temperature Tb_avg of the indoor space and the indoor floor temperature Tb_target of the target indoor unit is less than or equal to the third reference temperature Ty1 (Yes at S480'), the air conditioner may terminate the cooperative operation (support operation) of the support indoor unit.

When the absolute value of the difference between the average floor temperature Tb_avg of the indoor space and the indoor floor temperature Tb_target of the target indoor unit exceeds the third reference temperature Ty1 (NO at S548'), the air conditioner may determine whether the numbering of the support indoor unit is less than n (S481, i<n).

When the numbering of the support indoor unit is less than n (YES at S481), the air conditioner may increase the numbering of the support indoor unit by 1 (S482, i=i+1), and return to S460.

For example, if the priority of the support indoor units is calculated from No. 1 to No. 4 (S450), and S480' is not satisfied after support operation of No. 1 support indoor unit (i=1) (No at S480'), the support operation may be sequentially performed from No. 2 support indoor unit (i=2) to No. 4 support indoor unit (i=4) until S480' is satisfied or the support operation of all support indoor units is performed.

Accordingly, the air conditioner can quickly and effectively solve the temperature imbalance of the target indoor unit through cooperative operation (support operation) of the support indoor unit adjacent to the target indoor unit.

Figure 17:
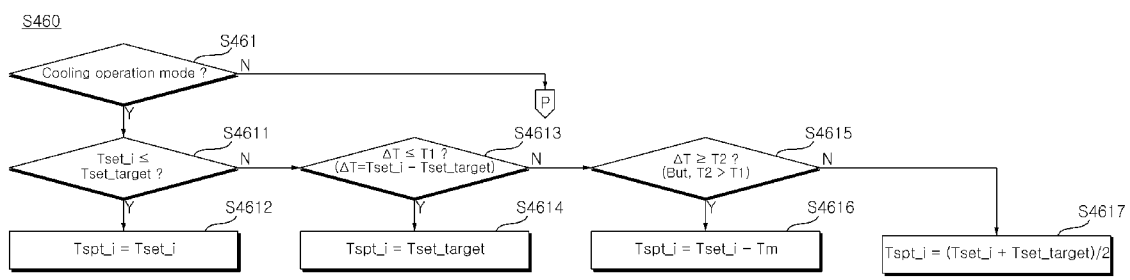
FIGS. 17 and 18 are diagrams for explaining a method of calculating a support temperature of a support indoor unit according to an embodiment of the present disclosure.
Figure 18:
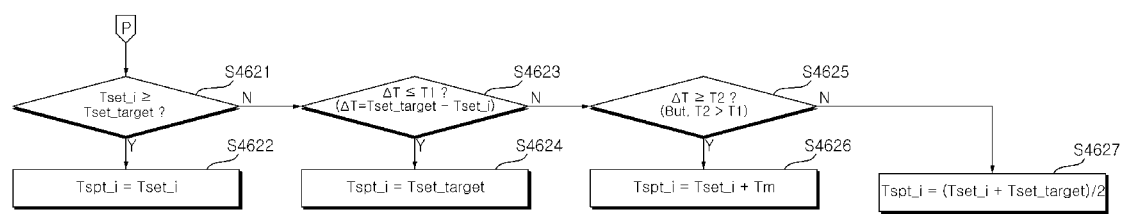

Referring to FIGS. 17 and 18, the air conditioner may calculate the support temperature Tspt_i of the i-th support indoor unit according to the operation mode (S460). Here, the support temperature Tspt_i may be a set temperature of the support indoor unit with respect to the target indoor unit in performing the support operation.

At S460, the air conditioner may determine whether the currently performing operation mode is a cooling operation mode or a heating operation mode (S461).

<Calculation of Support Temperature During Cooling Operation>

When the operation mode of the air conditioner is a cooling operation mode (Yes at S461), and the set temperature Tset_i of the i-th support indoor unit is less than or equal to the set temperature Tset_target of the target indoor unit (Yes at S4611), the air conditioner may calculate the support temperature Tspt_i of the i-th support indoor unit as the set temperature Tset_i of the i-th support indoor unit (S4612). That is, when the cooling set temperature of the support indoor unit is lower than the cooling set temperature of the target indoor unit, the support operation may be performed for the target indoor unit while maintaining the support temperature of the support indoor unit with the cooling set temperature.

When the operation mode of the air conditioner is the cooling operation mode (Yes at S461), the set temperature Tset_i of the i-th support indoor unit is higher than the set temperature Tset_target of the target indoor unit (No at S4611), and the temperature difference ΔT between the set temperature Tset_i of the i-th support indoor unit and the set temperature Tset_target of the target indoor unit is lower than or equal to the first temperature T1 (Yes at S4613), the air conditioner may calculate the support temperature Tspt_i of the i-th support indoor unit as the set temperature Tset-_target of the target indoor unit (S4614). For example, the first temperature T1 may be 1° C. That is, when the cooling set temperature of the support indoor unit is slightly higher than the cooling set temperature of the target indoor unit, even if the support temperature of the support indoor unit is set to the cooling set temperature of the target indoor unit, the support operation for the target indoor unit may be effectively performed without significantly changing the cooling load of the indoor space in which the support indoor unit is installed.

When the operation mode of the air conditioner is the cooling operation mode (Yes at S461), the set temperature Tset_i of the i-th support indoor unit is higher than the set temperature Tset_target of the target indoor unit (No at S4611), and the temperature difference ΔT is equal to or greater than the second temperature T2 (Yes at S4615), the support temperature Tspt_i of the i-th support indoor unit may be calculated as a temperature obtained by subtracting a certain temperature Tm from the set temperature Tset_i of the i-th support indoor unit (S4616). For example, the second temperature T2 may be 4° C., and the certain temperature Tm may be 2° C. That is, when the cooling set temperature of the support indoor unit is significantly higher than the cooling set temperature of the target indoor unit, if the support temperature of the support indoor unit is set to the cooling set temperature of the target indoor unit, the cooling load of the indoor space in which the support indoor unit is installed may be significantly changed. Accordingly, it may be preferable that the support operation for the target indoor unit is performed without significantly changing the cooling load of the indoor space where the support indoor unit is installed, by setting the support temperature of the support indoor unit to a temperature obtained by subtracting a certain temperature from the cooling set temperature of the support indoor unit.

When the operation mode of the air conditioner is the cooling operation mode (Yes at S461), the set temperature Tset_i of the i-th support indoor unit is higher than the set temperature Tset_target of the target indoor unit (No at S4611), and the temperature difference ΔT is greater than the first temperature T1 and less than the second temperature T2 (No at S4615), the air conditioner may calculate the support temperature Tspt_i of the i-th support indoor unit as an arithmetic mean of the set temperature Tset_i of the i-th support indoor unit and the set temperature Tset_target of the target indoor unit (S4617).

<Calculation of Support Temperature During Heating Operation>

When the operation mode of the air conditioner is the heating operation mode (No at S461), and the set temperature Tset_i of the i-th support indoor unit is equal to or higher than the set temperature Tset_target of the target indoor unit (Yes at S4621), the support temperature Tspt_i of the i-th support indoor unit may be calculated as the set temperature Tset_i of the i-th support indoor unit (S4622). That is, when the heating set temperature of the i-th support indoor unit is higher than the heating set temperature of the target indoor unit, the support operation may be performed for the target indoor unit while maintaining the support temperature of the support indoor unit with the heating set temperature.

When the operation mode of the air conditioner is the heating operation mode (No at S461), the set temperature Tset_i of the i-th support indoor unit is lower than the set temperature Tset_target of the target indoor unit (No at S4621), and the temperature difference ΔT between the set temperature Tset_target of the target indoor unit and the set temperature Tset_i of the i-th support indoor unit is equal to or less than the first temperature T1 (Yes at S4623), the support temperature Tspt_i of the i-th support indoor unit may be calculated as the set temperature Tset_target of the target indoor unit (S4624). For example, the first temperature T1 may be 1° C. That is, if the heating set temperature of the support indoor unit is slightly lower than the heating set temperature of the target indoor unit, even though the support temperature of the support indoor unit is set to the heating set temperature of the target indoor unit, the heating load of the indoor space in which the support indoor unit is installed does not change significantly, and the support operation for the target indoor unit can be effectively performed.

When the operation mode of the air conditioner is the heating operation mode (No at S461), the set temperature Tset_i of the i-th support indoor unit is lower than the set temperature Tset_target of the target indoor unit (No at S4621), and the temperature difference ΔT is equal to or greater than a second temperature T2 (Yes at S4625), the support temperature Tspt_i of the i-th support indoor unit may be calculated as the temperature obtained by adding a certain temperature Tm to the set temperature Tset_i of the i-th support indoor unit (S4626). For example, the second temperature T2 may be 4° C., and the certain temperature Tm may be 2° C. That is, when the heating set temperature of the support indoor unit is significantly lower than the heating set temperature of the target indoor unit, if the support temperature of the support indoor unit is set to the heating set temperature of the target indoor unit, the heating load of the indoor space in which the support indoor unit is installed may be significantly changed. Accordingly, it is preferable that the support operation is performed for the target indoor unit without significantly changing the heating load of the indoor space in which the support indoor unit is installed, by setting the support temperature of the support indoor unit to a temperature obtained by adding a certain temperature to the heating set temperature of the support indoor unit.

When the operation mode of the air conditioner is the heating operation mode (No at S461), the set temperature Tset_i of the i-th support indoor unit is lower than the set temperature Tset_target of the target indoor unit (No at S4621), and the temperature difference ΔT is greater than the first temperature T1 and less than the second temperature T2 (No at S4625), the support temperature Tspt_i of the i-th support indoor unit may be calculated as an arithmetic mean of the set temperature Tset_i of the i-th support indoor unit and the set temperature Tset_target of the target indoor unit (S4627).

Figure 19:
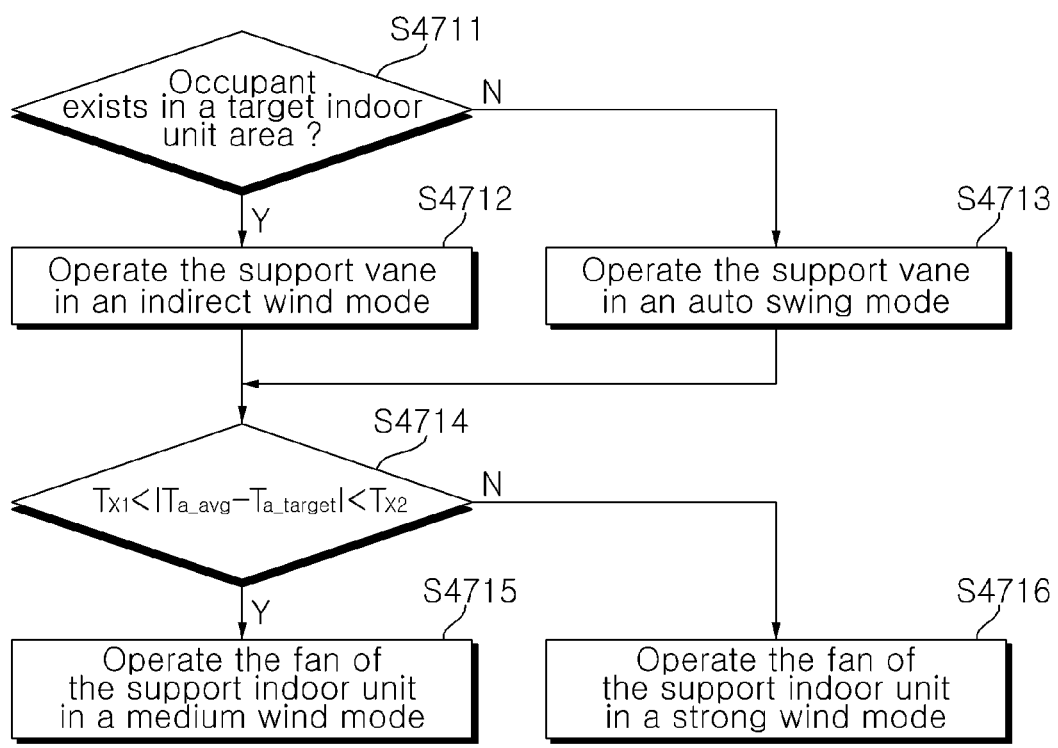
FIG. 19 is a flowchart illustrating an operation mode of a support vane and an indoor fan of support vane during a support operation of an air conditioner according to an embodiment of the present disclosure.

Referring to FIGS. 15 and 19, the air conditioner 1 may adjust the disposition of the support vane of the i-th support indoor unit and the rotation speed of the indoor fan 55 at operation S471.

The air conditioner 1 may determine whether an occupant exists in an area where the target indoor unit is installed through a human body sensor (not shown) disposed in the target indoor unit (S4711).

When an occupant exists in an area where the target indoor unit is installed (Yes at S4711), the air conditioner 1 may operate the support vane of the i-th support indoor unit in a first mode (indirect wind mode) (S4712). Here, the first mode (indirect wind mode) may be an operation mode in which the vane is disposed to form an indirect wind so that air does not flow toward the occupant existing in the target indoor unit area. For example, in the first mode (indirect wind mode), the support vanes may be disposed so that air discharged from the support indoor unit is discharged in a direction parallel to a ceiling. Accordingly, it is possible to ensure the occupant's comfort while solving the temperature imbalance of the target indoor unit area.

When there is no occupant in the area where the target indoor unit is installed (No at S4711), the air conditioner 1 may operate the support vane of the i-th support indoor unit in a second mode (auto swing mode) (S4713). Here, the second mode (auto swing mode) may be an operation mode in which the disposition of the support vane is continuously changed so that air is uniformly discharged from the support indoor unit to the area of the target indoor unit. For example, in the second mode (auto swing mode), the disposition of the support vane may be continuously changed so that air discharged from the support indoor unit is discharged from between a direction parallel to the ceiling and a direction perpendicular to the floor. Accordingly, air is uniformly discharged to the target indoor unit area, so that the temperature imbalance in the target indoor unit area can be quickly resolved.

After S4712 and S4713, the air conditioner 1 may determine the degree of temperature imbalance of the target indoor unit based on the absolute value of the difference between the average indoor air temperature Ta_avg of indoor units disposed in the same indoor space and the indoor air temperature Ta_target of the target indoor unit (S4714). For example, the air conditioner (1) may determine that the temperature imbalance of the target indoor unit continues, when the absolute value of the difference between the average indoor air temperature Ta_avg of indoor units disposed in the same indoor space and the indoor air temperature Ta_target of the target indoor unit is greater than the first reference temperature Tx1 and less than the second reference temperature Tx2. For example, the air conditioner 1 may determine that the temperature imbalance of the target indoor unit is intensified, when the absolute value of the difference between the average indoor air temperature Ta_avg of indoor units disposed in the same indoor space and the indoor air temperature Ta_target of the target indoor unit is greater than the second reference temperature Tx2. In this case, for example, the second reference temperature Tx2 may be 3° C.

When the temperature imbalance of the target indoor unit continues (Yes at S4714), the air conditioner 1 may operate the indoor fan of the support indoor unit in a first mode (medium wind mode) (S4715). Here, the first mode (medium wind mode) may be an operation mode in which the rotation speed of the indoor fan of the support indoor unit is adjusted to a first rotation speed so that the amount of air discharged from the support indoor unit is increased to a medium wind stronger than a weak wind.

When the temperature imbalance of the target indoor unit is intensified (No at S4714), the air conditioner 1 may operate the indoor fan of the support unit in a second mode (strong wind mode) (S4716). Here, the second mode (strong wind mode) may be an operation mode in which the rotation speed of the indoor fan of the support indoor unit is adjusted to a second rotation speed higher than the first rotation speed so that the amount of air discharged from the support indoor unit is increased to a strong wind stronger than the medium wind.

Accordingly, the temperature imbalance can be quickly resolved by adjusting the rotation speed of the indoor fan of the support indoor unit differently according to the degree of temperature imbalance of the target indoor unit.

Figure 20:
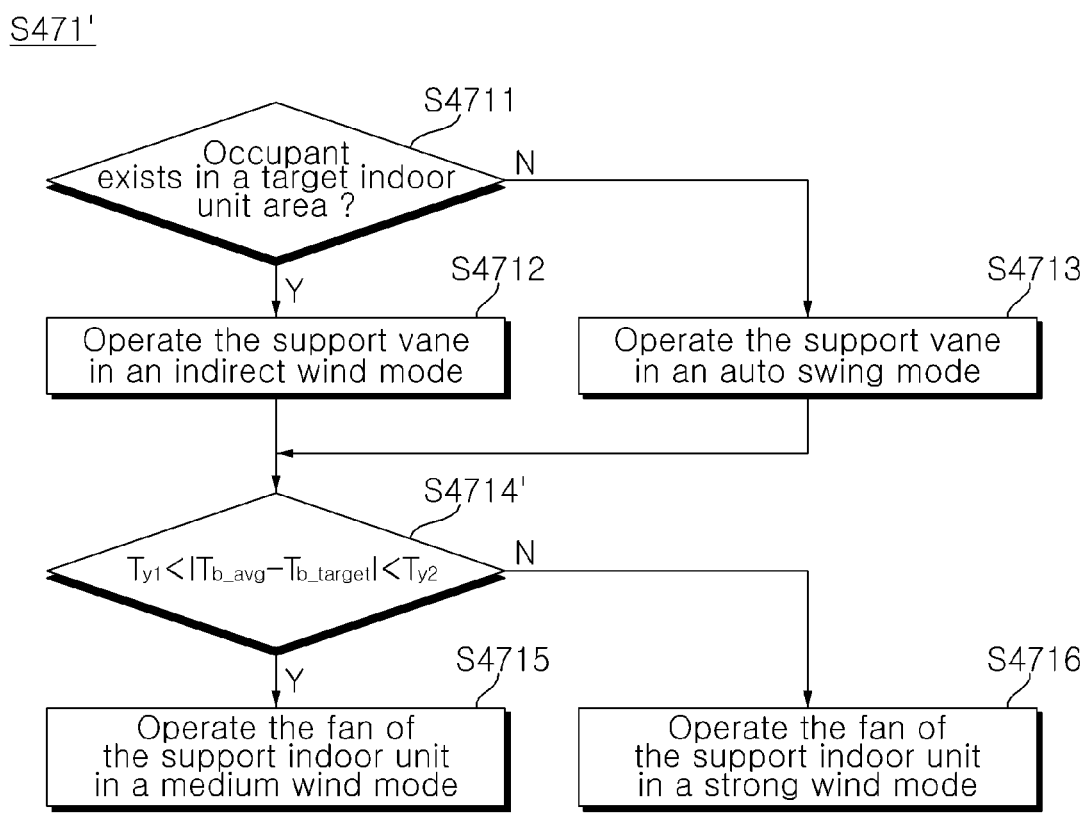
FIG. 20 is a flowchart illustrating an operation mode of a support vane and an indoor fan of support vane during a support operation of an air conditioner according to another embodiment of the present disclosure.

Referring to FIGS. 16 and 20, the air conditioner 1 may adjust the disposition of the support vane of the i-th support indoor unit and the rotation speed of the indoor fan 55 at operation S471'.

The air conditioner 1 may determine whether an occupant exists in an area where the target indoor unit is installed through a human body sensor (not shown) disposed in the target indoor unit (S4711).

When an occupant exists in the area where the target indoor unit is installed (Yes at S4711), the air conditioner 1 may operate the support vane of the i-th support indoor unit in a first mode (indirect wind mode) (S4712). Here, the first mode (indirect wind mode) may be an operation mode in which the vane is disposed to form an indirect wind so that air does not flow toward the occupants existing in the target indoor unit area. For example, in the first mode (indirect wind mode), the support vanes may be disposed so that air discharged from the support indoor unit is discharged in a direction parallel to the ceiling. Accordingly, it is possible to ensure the occupant's comfort and, at the same time, solve the temperature imbalance of the target indoor unit area.

When there is no occupant in the area where the target indoor unit is installed (No at S4711), the air conditioner 1 may operate the support vane of the i-th support indoor unit in a second mode (auto swing mode) (S4713). Here, the second mode (auto swing mode) may be an operation mode in which the disposition of the support vane is continuously changed so that air is uniformly discharged from the support indoor unit to the target indoor unit area. For example, in the second mode (auto swing mode), the disposition of the support vane may be continuously changed so that air discharged from the support indoor unit is discharged from between a direction parallel to the ceiling and a direction perpendicular to the floor. Accordingly, air is uniformly discharged to the target indoor unit area, so that the temperature imbalance in the target indoor unit area can be quickly resolved.

After S4712 and S4713, the air conditioner 1 may determine the degree of temperature imbalance of the target indoor unit based on the absolute value of the difference between the average indoor floor temperature Tb_avg of indoor units disposed in the same indoor space and the indoor floor temperature Tb_target of the target indoor unit (S4714'). For example, the air conditioner 1 may determine that the temperature imbalance of the target indoor unit continues, when the absolute value of the difference between the average indoor floor temperature Tb_avg of indoor units disposed in the same indoor space and the indoor floor temperature Tb_target of the target indoor unit is greater than a third reference temperature Ty1 and less than a fourth reference temperature Ty2. For example, the air conditioner 1 may determine that the temperature imbalance of the target indoor unit is intensified, when the absolute value of the difference between the average indoor floor temperature Tb_avg of indoor units disposed in the same indoor space and the indoor floor temperature Tb_target of the target indoor unit is greater than the fourth reference temperature Ty2. In this case, for example, the fourth reference temperature Ty2 may be 1.5° C.

When the temperature imbalance of the target indoor unit continues (Yes at S4714'), the air conditioner 1 may operate the indoor fan of the support indoor unit in a first mode (medium wind mode) (S4715). Here, the first mode (medium wind mode) may be an operation mode in which the rotation speed of the indoor fan of the support indoor units is adjusted to a first rotation speed so that the amount of air discharged from the support indoor unit is increased to a medium wind stronger than a weak wind.

When the temperature imbalance of the target indoor unit is intensified (No at S4714), the air conditioner 1 may operate the indoor fan of the support indoor unit in a second mode (strong wind mode) (S4716). Here, the second mode (strong wind mode) may be an operation mode in which the rotation speed of the indoor fan of the support indoor unit is adjusted to a second rotation speed higher than the first rotation speed so that the amount of air discharged from the support indoor unit is increased to a strong wind stronger than the medium wind.

Accordingly, the temperature imbalance can be quickly resolved by adjusting the rotation speed of the indoor fan of the support indoor unit differently according to the degree of temperature imbalance of the target indoor unit.

According to an aspect of the present disclosure, a method of controlling an air conditioner including an outdoor unit; and a plurality of indoor units respectively comprising a vane connected to the outdoor unit and adjusting a wind direction, and a fan for forming an air flow, includes: detecting an indoor temperature of each of the plurality of indoor units through a temperature sensor disposed in each of the plurality of indoor units; specifying an indoor unit having a temperature imbalance as a target indoor unit based on the indoor temperature of each of the plurality of indoor units detected through the temperature sensor; specifying indoor units adjacent to the target indoor unit as a support indoor unit; and performing a support operation for resolving a temperature imbalance of the target indoor unit by adjusting a vane and a fan of the support indoor unit.

According to another aspect of the present disclosure, the vane of the supporter indoor unit which is controlled in performing the support operation is a vane that has the greatest influence on a change in an indoor air temperature of the target indoor unit among vanes of the support indoor unit, and is a support vane for the target indoor unit.

In addition, according to another aspect of the present disclosure, the performing a support operation includes: determining whether an occupant exists in an area of the target indoor unit through a human body sensor disposed in each of the plurality of indoor units; and adjusting a disposition of the support vane according to a presence or absence of occupant in the area of the target indoor unit.

In addition, according to another aspect of the present disclosure, in adjusting a disposition of the support vane, an operation mode of the support vane is performed in a first mode in which the disposition of the support vane is adjusted so that air does not flow toward an occupant, when the occupant exists in an indoor area of the target indoor unit, and is performed in a second mode in which the disposition of the support vane is continuously changed, when there is no occupant in the indoor area of the target indoor unit.

In addition, according to another aspect of the present disclosure, the performing a support operation includes: determining a degree of temperature imbalance of a target indoor unit based on an absolute value of a difference between an average indoor temperature of indoor units disposed in a same indoor space and an indoor temperature of the target indoor unit; and adjusting a fan of the support indoor unit based on the degree of temperature imbalance of the target indoor unit.

In addition, according to another aspect of the present disclosure, the adjusting a fan of the support indoor unit includes: adjusting a rotation speed of the fan of the support indoor unit to a first rotation speed, when an absolute value of a difference between an average indoor unit air temperature of indoor units disposed in a same indoor space and an indoor air temperature of target indoor unit is greater than a first reference temperature and less than a second reference temperature; and adjusting the rotation speed of the fan of the support indoor unit to a second rotation speed higher than the first rotation speed, when an absolute value of a difference between an average indoor unit air temperature of indoor units disposed in a same indoor space and an indoor air temperature of target indoor unit is greater than the second reference temperature.

In addition, according to another aspect of the present disclosure, the adjusting a fan of the support indoor unit includes: adjusting a rotation speed of the fan of the support indoor unit to a first rotation speed, when an absolute value of a difference between an average indoor unit floor temperature of indoor units disposed in a same indoor space and an indoor floor temperature of target indoor unit is greater than a third reference temperature and less than a fourth reference temperature, and adjusting the rotation speed of the fan of the support indoor unit to a second rotation speed higher than the first rotation speed, when an absolute value of a difference between an average indoor unit floor temperature of indoor units disposed in a same indoor space and the indoor floor temperature of the target indoor unit is greater than the fourth reference temperature.

In addition, according to another aspect of the present disclosure, the method further includes: detecting an indoor floor temperature of each of the plurality of indoor units through a second temperature sensor disposed in each of the plurality of indoor units; and determining a relative position between indoor units disposed in a same indoor space by comparing a floor temperature distribution for each area of each of the plurality of indoor units detected by the second temperature sensor.

In addition, according to another aspect of the present disclosure, the method further includes: determining a vane direction of each of a plurality of indoor units disposed in a same indoor space based on a relative position between the plurality of indoor units.

In addition, according to another aspect of the present disclosure, the determining a vane direction of each of the plurality of indoor units includes: selecting any one indoor unit from among a plurality of indoor units disposed in a same indoor space as a reference indoor unit; sequentially operating the vane of each indoor unit adjacent to the reference indoor unit; detecting a temperature change of indoor air of the reference indoor unit according to a vane operation of each indoor unit adjacent to the reference indoor unit; and determining a vane direction of each indoor unit adjacent to the reference indoor unit based on the temperature change of indoor air of the indoor unit.

In addition, according to another aspect of the present disclosure, the determining a vane direction of each indoor unit adjacent to the reference indoor unit includes determining a vane having the greatest influence on the temperature change of indoor air of the reference indoor unit, among vanes of each indoor unit adjacent to the reference indoor unit, as a support vane for the reference indoor unit.

In addition, according to another aspect of the present disclosure, the support vane is disposed in a position facing the reference indoor unit in an indoor unit adjacent to the reference indoor unit.

In addition, according to another aspect of the present disclosure, among the indoor units disposed in the same indoor space, the target indoor unit is an indoor unit which detects an indoor unit air temperature having a difference for an average air temperature of indoor units disposed in a same indoor space, when the difference is higher than a first reference temperature, or an indoor unit which detects an indoor unit air temperature having a difference for an average floor temperature of indoor units disposed in a same indoor space, when the difference is higher than a third reference temperature.

In addition, according to another aspect of the present disclosure, the first reference temperature is higher than the third reference temperature.

In addition, according to another aspect of the present disclosure, the method further includes calculating a priority of support operation for the target indoor unit of the support indoor units.

In addition, according to another aspect of the present disclosure, the calculating a priority of support operation includes: calculating the priority of the support indoor units by reflecting at least one of whether the support indoor units perform the support operation, a degree of difference between a set temperature of the support indoor units and an indoor space air temperature, a cooling or heating rated capacity of the support indoor units, and whether the support indoor units are in a cooling or heating operation; and performing a support operation of the support indoor units according to the priority of the support indoor units.

In addition, according to another aspect of the present disclosure, an air conditioner includes; an outdoor unit; a plurality of indoor units connected to the outdoor unit, and respectively comprising a vane for controlling a wind direction; a first temperature sensor disposed in each of the plurality of indoor units, and detecting an indoor air temperature of each of the plurality of indoor units; and a controller controlling operations of the outdoor unit and the plurality of indoor units; wherein, when there exists a target indoor unit that has an indoor air temperature having a difference, which relates to an average temperature of indoor air temperature of a plurality of indoor units detected by the first temperature sensor, that exceeds a first reference temperature, the controller performs a support operation for adjusting a support vane of a support indoor unit adjacent to the target indoor unit.

In addition, according to another aspect of the present disclosure, an air conditioner includes; an outdoor unit; a plurality of indoor units connected to the outdoor unit, and respectively comprising a vane for controlling a wind direction; a second temperature sensor disposed in each of the plurality of indoor units, and detecting a floor temperature of each of the plurality of indoor units; and a controller controlling operations of the outdoor unit and the plurality of indoor units; wherein, when there exists a target indoor unit that has an indoor floor temperature having a difference, which relates to an average temperature of indoor floor temperature of a plurality of indoor units detected by the second temperature sensor, that exceeds a third reference temperature, the controller performs a support operation for adjusting a support vane of a support indoor unit adjacent to the target indoor unit.

In addition, according to another aspect of the present disclosure, the controller adjusts a support vane of the support indoor unit to face the target indoor unit during the support operation.

The effect of the air conditioner according to the present disclosure will be described as follows.

According to at least one embodiment of the present disclosure, it is possible to provide an air conditioner capable of quickly and effectively resolving the temperature imbalance in an indoor space without limiting the capacity of the target indoor unit, by adjusting the vane of the support indoor unit adjacent to the target indoor unit where the temperature imbalance has occurred based on the relative position of the indoor units and the vane direction of the indoor units, and a control method of air conditioner capable of resolving the above temperature imbalance.

According to at least one embodiment of the present disclosure, it is possible to provide an air conditioner capable of automatically classifying indoor units disposed in the same indoor space based on temperature characteristics of indoor air for each indoor space, and a specific control method of air conditioner for the above classification.

According to at least one embodiment of the present disclosure, it is possible to provide an air conditioner that can determine the relative position of the indoor units disposed in the same indoor space by selecting the position of the indoor units adjacent to an arbitrary indoor unit based on the arbitrary indoor unit disposed in the same indoor space, and a control method of air conditioner capable of determining the relative position of the indoor units.

According to at least one embodiment of the present disclosure, it is possible to provide an air conditioner capable of determining a vane direction of each indoor unit based on the relative position of the indoor units disposed in the same indoor space, and a control method of air conditioner capable of determining a vane direction of each of the indoor units.

The additional scope of applicability of the present disclosure will be apparent from the above detailed description. However, those skilled in the art will appreciate that various modifications and alterations are possible, without departing from the idea and scope of the present disclosure, and therefore it should be understood that the detailed description and specific embodiments, such as the preferred embodiments of the present disclosure, are provided only for illustration.

Any or other embodiments of the present disclosure described above are not mutually exclusive or distinct. Any or other embodiments of the present disclosure described above may be used jointly or combined in each configuration or function.

For example, it means that configuration A described in a specific embodiment and/or drawings may be combined with configuration B described in other embodiments and/or drawings. That is, even if the coupling between the components is not directly described, it means that the coupling is possible except for the case where it is described that the coupling is impossible.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

What is claimed is:

1. A method of controlling an air conditioner, the air conditioner comprising an outdoor unit; and a plurality of indoor units respectively connected to the outdoor unit and comprising at least one vane that adjusts a wind direction, and a fan that forms an air flow, the method comprising:
    detecting an indoor temperature of each of the plurality of indoor units through a temperature sensor disposed in each of the plurality of indoor units;
    specifying an indoor unit having a temperature imbalance as a target indoor unit based on the indoor temperature of each of the plurality of indoor units detected through the temperature sensor;
    specifying indoor units adjacent to the target indoor unit as support indoor units; and
    performing a support operation for resolving the temperature imbalance of the target indoor unit by adjusting the at least one vane and the fan of the support indoor units, wherein the performing of the support operation comprises:
        determining a degree of the temperature imbalance of the target indoor unit based on an absolute value of a difference between an average indoor temperature of indoor units disposed in a same indoor space and the indoor temperature of the target indoor unit; and
        adjusting the fan of the support indoor units based on the degree of the temperature imbalance of the target indoor unit.

2. The method of claim 1, wherein the at least one vane of the support indoor units which is controlled in the performing of the support operation is a vane that has a greatest influence on a change in the indoor air temperature of the target indoor unit among vanes of the support indoor units, and is a support vane for the target indoor unit.

3. The method of claim 2, wherein the performing of the support operation comprises:
    determining whether an occupant exists in an area of the target indoor unit through a human body sensor disposed in each of the plurality of indoor units; and
    adjusting a disposition of the support vane according to a presence or absence of occupant in the area of the target indoor unit.

4. The method of claim 3, wherein in the adjusting of the disposition of the support vane, an operation mode of the support vane is performed in a first mode in which the disposition of the support vane is adjusted so that air does not flow toward an occupant, when the occupant exists in an indoor area of the target indoor unit, and is performed in a second mode in which the disposition of the support vane is continuously changed, when there is no occupant in the indoor area of the target indoor unit.

5. The method of claim 1, wherein the adjusting of the fan of the support indoor units comprises:
    adjusting a rotational speed of the fan of the support indoor units to a first rotational speed, when the absolute value of the difference between the average indoor unit air temperature of the indoor units disposed in the same indoor space and the indoor air temperature of the target indoor unit is greater than a first reference temperature and less than a second reference temperature; and
    adjusting the rotational speed of the fan of the support indoor units to a second rotational speed higher than the first rotational speed, when the absolute value of the difference between the average indoor unit air temperature of the indoor units disposed in the same indoor space and the indoor air temperature of the target indoor unit is greater than the second reference temperature.

6. The method of claim 1, wherein the adjusting of the fan of the support indoor units comprises:
    adjusting a rotational speed of the fan of the support indoor units to a first rotational speed, when an absolute value of a difference between an average indoor unit floor temperature of the indoor units disposed in the same indoor space and an indoor floor temperature of the target indoor unit is greater than a third reference temperature and less than a fourth reference temperature, and adjusting the rotational speed of the fan of the support indoor units to a second rotational speed higher than the first rotational speed, when the absolute value of the difference between the average indoor unit floor temperature of the indoor units disposed in the same indoor space and the indoor floor temperature of the target indoor unit is greater than the fourth reference temperature.

7. The method of claim 1, further comprising:
detecting an indoor floor temperature of each of the plurality of indoor units through a second temperature sensor disposed in each of the plurality of indoor units; and
determining a relative position between indoor units disposed in a same indoor space by comparing a floor temperature distribution for each area of each of the plurality of indoor units detected by the second temperature sensor.

8. The method of claim 7, further comprising:
determining a vane direction of each of the plurality of indoor units disposed in the same indoor space based on a relative position between the plurality of indoor units.

9. The method of claim 8, wherein the determining of the vane direction of each of the plurality of indoor units comprises:
selecting any one indoor unit from among the plurality of indoor units disposed in the same indoor space as a reference indoor unit;
sequentially operating the vane of each indoor unit adjacent to the reference indoor unit;
detecting a temperature change of indoor air of the reference indoor unit according to a vane operation of each indoor unit adjacent to the reference indoor unit; and
determining a vane direction of each indoor unit adjacent to the reference indoor unit based on the temperature change of indoor air of the indoor unit.

10. The method of claim 9, wherein the determining of the vane direction of each indoor unit adjacent to the reference indoor unit comprises determining a vane having a greatest influence on a temperature change of indoor air of the reference indoor unit, among vanes of each indoor unit adjacent to the reference indoor unit, as a support vane for the reference indoor unit.

11. The method of claim 10, wherein the support vane is disposed in a position facing the reference indoor unit in an indoor unit adjacent to the reference indoor unit.

12. The method of claim 1, wherein the target indoor unit is an indoor unit that detects an indoor unit air temperature having a difference for an average air temperature of the indoor units disposed in the same indoor space, when the difference is higher than a first reference temperature, among the indoor units disposed in the same indoor space, or an indoor unit that detects an indoor unit air temperature having a difference for an average floor temperature of the indoor units disposed in the same indoor space, when the difference is higher than a second reference temperature, among the indoor units disposed in the same indoor space.

13. The method of claim 12, wherein the first reference temperature is higher than the second reference temperature.

14. The method of claim 1, further comprising:
calculating a priority of the support operation for the target indoor unit of the support indoor units.

15. The method of claim 14, wherein the calculating of the priority of support operation comprises:
calculating the priority of the support indoor units by reflecting at least one of whether the support indoor units perform the support operation, a degree of difference between a set temperature of the support indoor units and an indoor space air temperature, a cooling or heating rated capacity of the support indoor units, or whether the support indoor units are in a cooling or heating operation; and
performing a support operation of the support indoor units according to the priority of the support indoor units.

16. An air conditioner, comprising:
an outdoor unit;
a plurality of indoor units connected to the outdoor unit, and respectively comprising at least one vane that controls a wind direction;
a temperature sensor that is disposed in each of the plurality of indoor units, and detects an indoor temperature of each of the plurality of indoor units; and
a controller that controls operations of the outdoor unit and the plurality of indoor units, wherein, when there exists a target indoor unit that has an indoor air temperature having a difference, which relates to an average temperature of the indoor air temperature of the plurality of indoor units detected by the temperature sensor, that exceeds a reference temperature, the controller performs a support operation for adjusting the at least one vane and a fan of an indoor unit adjacent to the target indoor unit designated as a support indoor unit, wherein the controller performs the support operation by determining a degree of temperature imbalance of the target indoor unit based on an absolute value of a difference between the average indoor temperature of indoor units disposed in a same indoor space and the indoor temperature of the target indoor unit and adjusting the fan of the support indoor unit based on the degree of the temperature imbalance of the target indoor unit.

17. The air conditioner of claim 16, wherein the controller adjusts the at least one vane of the support indoor unit to face the target indoor unit during the support operation.

18. An air conditioner, comprising:
an outdoor unit;
a plurality of indoor units connected to the outdoor unit, and respectively comprising at least one vane for that controls a wind direction;
a temperature sensor that is disposed in each of the plurality of indoor units, and detects a floor temperature of each of the plurality of indoor units; and
a controller that controls operations of the outdoor unit and the plurality of indoor units, wherein, when there exists a target indoor unit that has an indoor floor temperature having a difference, which relates to an average temperature of the indoor floor temperature of the plurality of indoor units detected by the temperature sensor, that exceeds a reference temperature, the controller performs a support operation for adjusting the at least one vane and a fan of an indoor unit adjacent to the target indoor unit designated as a support indoor unit, wherein the controller performs the support operation by determining a degree of temperature imbalance of the target indoor unit based on an absolute value of a difference between the average indoor temperature of indoor units disposed in a same indoor space and an indoor temperature of the target indoor unit and adjusting the fan of the support indoor unit based on the degree of the temperature imbalance of the target indoor unit.

\* \* \* \* \*